United States Patent
Kwak

(10) Patent No.: US 11,409,308 B2
(45) Date of Patent: Aug. 9, 2022

(54) ROBOT CLEANER AND A CONTROLLING METHOD FOR THE SAME

(71) Applicant: LG Electronics Inc., Seoul (KR)

(72) Inventor: Donghoon Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 16/562,678

(22) Filed: Sep. 6, 2019

(65) Prior Publication Data
US 2020/0081454 A1 Mar. 12, 2020

Related U.S. Application Data

(60) Provisional application No. 62/727,562, filed on Sep. 6, 2018.

(30) Foreign Application Priority Data

Feb. 1, 2019 (KR) .......................... 10-2019-0014054

(51) Int. Cl.
*G05D 1/02* (2020.01)
*A47L 11/40* (2006.01)
(Continued)

(52) U.S. Cl.
CPC ............ *G05D 1/0287* (2013.01); *A47L 9/009* (2013.01); *A47L 9/2852* (2013.01); *A47L 9/2894* (2013.01);
(Continued)

(58) Field of Classification Search
CPC .. G05D 1/0287; G05D 1/0223; G05D 1/0276; G05D 1/0289; G05D 2201/0203;
(Continued)

(56) References Cited

U.S. PATENT DOCUMENTS 5,652,489 A 7/1997 Kawakami
5,819,008 A 10/1998 Asama et al.
(Continued)

FOREIGN PATENT DOCUMENTS

CN 103522304 A 1/2014
CN 104997461 A 10/2015
(Continued)

OTHER PUBLICATIONS

Korean Office Action in Korean Application No. KR 10-2019-0014054, dated Aug. 10, 2020 (13 pages).
(Continued)

*Primary Examiner* — Bhavesh V Amin
(74) *Attorney, Agent, or Firm* — Birch, Stewart, Kolasch & Birch, LLP

(57) ABSTRACT

A mobile robot according to an embodiment of the present disclosure may comprise a main body, a moving unit configured to move the main body, a communication unit configured to communicate with a second mobile robot that emits a signal, and a controller configured to recognize a position of the another mobile robot using the signal, control the moving unit to follow a trajectory corresponding to a movement of the another mobile robot based on the recognized position, and in response to the length of trajectory to be followed by the main body deviating from the predetermined range, output a control command to cause a moving speed of the main body or the second mobile robot to change.

18 Claims, 26 Drawing Sheets

(51) Int. Cl.
*A47L 9/28* (2006.01)
*A47L 9/00* (2006.01)

(52) U.S. Cl.
CPC ....... *A47L 11/4011* (2013.01); *A47L 11/4061* (2013.01); *G05D 1/0223* (2013.01); *G05D 1/0276* (2013.01); *A47L 2201/04* (2013.01); *G05D 1/0289* (2013.01); *G05D 2201/0203* (2013.01)

(58) Field of Classification Search
CPC .... G05D 1/0236; G05D 1/0293; A47L 9/009; A47L 9/2852; A47L 9/2894; A47L 11/4011; A47L 11/4061; A47L 2201/04; A47L 9/28
See application file for complete search history.

(56) References Cited

U.S. PATENT DOCUMENTS

| | | | |
|---|---|---|---|
| 5,825,981 | A | 10/1998 | Matsuda |
| 6,374,155 | B1 | 4/2002 | Wallach et al. |
| 6,496,755 | B2 | 12/2002 | Wallach et al. |
| 7,054,716 | B2 | 5/2006 | McKee et al. |
| 8,496,078 | B2 | 7/2013 | Wellborn et al. |
| 8,627,908 | B2 | 1/2014 | Wellborn et al. |
| 8,755,936 | B2 | 6/2014 | Friedman et al. |
| 8,918,950 | B2 * | 12/2014 | Song ................ A47L 5/225 15/319 |
| 9,687,131 | B2 * | 6/2017 | Eidmohammadi ................ A47L 11/4066 |
| 9,924,699 | B2 * | 3/2018 | Wisse ................ A47L 9/009 |
| 10,602,898 | B2 * | 3/2020 | Scholten ............. G05D 1/0261 |
| 2004/0073337 | A1 * | 4/2004 | McKee ................ G05D 1/0274 700/245 |
| 2004/0204804 | A1 | 10/2004 | Lee et al. |
| 2006/0106496 | A1 | 5/2006 | Okamoto |
| 2006/0293794 | A1 * | 12/2006 | Harwig ................ G05D 1/0261 180/23 |
| 2007/0050937 | A1 * | 3/2007 | Song ................ A47L 9/0009 15/319 |
| 2007/0118248 | A1 | 5/2007 | Lee et al. |
| 2010/0256852 | A1 | 10/2010 | Mudalige |
| 2012/0193153 | A1 * | 8/2012 | Wellborn ............. B60W 10/08 180/14.2 |
| 2013/0060401 | A1 | 3/2013 | Hahne |
| 2014/0124004 | A1 * | 5/2014 | Rosenstein .......... G05D 1/0219 15/3 |
| 2014/0172223 | A1 | 6/2014 | Murphy |
| 2015/0297052 | A1 * | 10/2015 | Eidmohammadi .. G05D 1/0225 15/4 |
| 2016/0188977 | A1 | 6/2016 | Kearns et al. |
| 2017/0113342 | A1 | 4/2017 | Abramson |
| 2017/0332868 | A1 * | 11/2017 | Nam ................ A47L 9/04 |
| 2018/0073266 | A1 | 3/2018 | Goldenberg et al. |
| 2018/0092499 | A1 * | 4/2018 | Strazisar ............. G05D 1/0285 |
| 2018/0178391 | A1 | 6/2018 | Naito et al. |
| 2018/0181143 | A1 | 6/2018 | Hiramatsu |
| 2018/0192845 | A1 * | 7/2018 | Gu ................ B25J 13/086 |
| 2018/0361569 | A1 * | 12/2018 | Hackert ............. G05D 1/0212 |
| 2020/0081453 | A1 * | 3/2020 | Kwak ................ A47L 11/4011 |
| 2020/0081454 | A1 * | 3/2020 | Kwak ................ A47L 11/4061 |
| 2020/0081456 | A1 * | 3/2020 | Kwak ................ G05D 1/0289 |

FOREIGN PATENT DOCUMENTS

| | | |
|---|---|---|
| CN | 105686766 A | 6/2016 |
| CN | 205942412 U | 2/2017 |
| CN | 206473273 U | 9/2017 |
| CN | 107479544 A | 12/2017 |
| CN | 206850525 U | 1/2018 |
| CN | 108420371 A | 8/2018 |
| JP | 63-150044 A | 6/1988 |
| JP | 8-63229 A | 3/1996 |
| JP | 2002-215236 A | 7/2002 |
| JP | 2003-15739 A | 1/2003 |
| JP | 2003-269914 A | 9/2003 |
| JP | 2005-192609 A | 7/2005 |
| JP | 2005192609 A | 7/2005 |
| JP | 2006-146491 A | 6/2006 |
| JP | 2007-149088 A | 6/2007 |
| JP | 2008-191800 A | 8/2008 |
| JP | 2010-015194 A | 1/2010 |
| JP | 2010-79698 A | 4/2010 |
| JP | 2010-108433 A | 5/2010 |
| JP | 2010-235080 A | 10/2010 |
| JP | 2010-238132 A | 10/2010 |
| JP | 4639253 B2 | 2/2011 |
| JP | 2015-14600 A | 1/2015 |
| JP | 2015-160022 A | 9/2015 |
| JP | 2016-57945 A | 4/2016 |
| JP | 2017-129909 A | 7/2017 |
| JP | 2017-146945 A | 8/2017 |
| JP | 2017-199190 A | 11/2017 |
| JP | 2018-120526 A | 8/2018 |
| KR | 10-1155500 B1 | 6/2012 |
| KR | 10-2011-0100712 | 9/2012 |
| KR | 10-2014-0112824 A | 9/2014 |
| KR | 10-2016-0063140 A | 6/2016 |
| KR | 10-2016-0070467 A | 6/2016 |
| KR | 10-2016-0133348 A | 11/2016 |
| KR | 10-2017-0090631 A | 8/2017 |
| KR | 10-2018-0031153 A | 3/2018 |
| KR | 10-2018-0046175 A | 5/2018 |
| KR | 10-2018-0048705 A | 5/2018 |
| TW | 201350295 A | 12/2013 |
| TW | 201722336 A | 7/2017 |
| TW | 1654961 B | 4/2019 |
| WO | WO 2014/207299 A1 | 12/2014 |
| WO | WO 2017/036532 A1 | 3/2017 |

OTHER PUBLICATIONS

International Search Report and Written Opinion received in PCT Application No. PCT/KR2019/008800, dated Nov. 18, 2019 (12 pages).
Korean Office Action in Korean Application No. KR 10-2019-0020081, dated Nov. 11, 2020 (6 pages).
Taiwanese Office Action in Taiwanese Application No. 108128347, dated May 28, 2021 (7 pages).
International Search Report, PCT/KR2019/009045; dated Nov. 21, 2019 (12 pages).
Taiwanese Office Action in Taiwanese Application No. 108131942, dated Jul. 7, 2021 (21 pages).
Examination Report in Australian Application No. 2019334724, dated Oct. 27, 2021 (4 pages).

* cited by examiner

ROBOT CLEANER AND A CONTROLLING METHOD FOR THE SAME

CROSS-REFERENCE TO RELATED APPLICATIONS

The present application claims priority to U.S. Provisional Application No. 62/727,562, filed on Sep. 6, 2018, and Korean Application No. 10-2019-0014054, filed on Feb. 1, 2019, the disclosures of which are hereby incorporated by reference in their entireties.

BACKGROUND

1. Technical Field

The present disclosure relates to a plurality of mobile robots that autonomously move while following other.

2. Description of the Related Art

In general, a mobile robot is a device that automatically performs a predetermined operation while moving by itself in a predetermined area without a user's operation. The mobile robot senses obstacles located in the area and performs its operations by moving close to or away from such obstacles.

Such a mobile robot may include a robot cleaner that performs cleaning while moving in an area.

The robot cleaner is a cleaner that performs cleaning while moving by itself without a user's operation.

In this manner, with the development of such a robot cleaner that can perform cleaning while moving by itself without a user's operation, there is a need to develop a plurality of robot cleaners for performing cleaning while following other or while collaborating with each other without a user's operation.

The prior art document WO2017-036532 discloses a method in which a master robot cleaner (hereinafter, referred to as a master robot) controls at least one slave robot cleaner (hereinafter, referred to as a slave robot).

The prior art document discloses a configuration in which the master robot detects adjacent obstacles by using an obstacle detection device and determines its position related to the slave robot using position data derived from the obstacle detection device.

In addition, the prior art discloses a configuration in which the master robot and the slave robot communicate with each other via a server using wireless local area network (WLAN) technology.

According to the prior art document, the master robot can determine the position of the slave robot but the slave robot cannot determine the position of the master robot.

Furthermore, in order for the slave robot to determine (decide) the position of the master robot using the configuration disclosed in the prior art document, the master robot must transmit relative position information regarding the slave robot determined by the master robot to the slave robot through the server.

However, the prior art fails to disclose such a configuration in which the master robot transmits relative position information to the slave robot via the server.

In addition, even if it is assumed that the master robot transmits relative position information, the master robot and the slave robot communicates only through the server. Accordingly, such communication with the server may be disconnected when the master robot or the slave robot is located at a place where it is difficult to communicate with a server.

In this case, since the slave robot is unable to receive relative position information from the server, the slave robot is unable to know the position of the master robot. As a result, there may arise a problem that follow-up or collaboration among a plurality of robot cleaners is not efficiently performed.

Furthermore, in a case where any one of the plurality of robot cleaners performs collaborative cleaning while following another one, when the follow-up moving of the follower cleaner is controlled based on how far a relative position between the head cleaner and the follower cleaner is, there may arise a problem that follow-up or collaboration may not be efficiently carried out in an exceptional situation in which the moving directions of the head cleaner and the follower cleaner are different or they should avoid each other. In addition, such problems may similarly occur among a plurality of mobile robots capable of performing a specific function (e.g., air conditioning function, etc.) while moving by themselves without a user's manipulation.

SUMMARY

Accordingly, an object of the present disclosure is to provide a mobile robot capable of moving while any one of a plurality of mobile robots follows a moving path of one another with no interference or collision with each other and without going through a server, and a control method thereof.

Furthermore, another object of the present disclosure is to provide a mobile robot that can be controlled to perform flexible follow-up without any interruption when any one of a plurality of mobile robots follows another one thereof, and a control method thereof.

In addition, yet still another object of the present disclosure is to provide a mobile robot capable of performing follow-up moving of a following mobile robot on the basis of a length of trajectory of a leading mobile robot to be actually followed by the following mobile robot during follow-up of a plurality of mobile robots so as to perform efficient follow-up control without collision or delay even in an exceptional situation where the moving directions of the leading mobile robot and the following mobile robot are different or they should avoid each other, and a control method thereof.

Besides, still yet another object of the present disclosure is to provide a mobile robot capable of controlling the moving of a leading mobile robot and a following mobile robot on the basis of a length of trajectory of to be actually followed by the following mobile robot during follow-up of a plurality of mobile robots, and a control method thereof.

Moreover, yet still another object of the present disclosure is to provide a mobile robot capable of performing efficient follow-up control in consideration of both a length of trajectory to be followed by a following mobile robot and an actual separation distance between a plurality of mobile robots during follow-up of the plurality of mobile robots, and a control method thereof.

Furthermore, still yet another object of the present disclosure is to provide a mobile robot capable of reducing a movement speed of a following mobile robot or allowing the following mobile robot to follow the trajectory of a leading mobile robot in place when a length of trajectory to be followed by the following mobile robot is decreased, and reducing or stopping a movement speed of the leading mobile robot when a length of trajectory to be followed by the following mobile robot is increased so as to allow the following mobile robot to follow the leading mobile robot without missing, and a control method thereof.

In addition, yet still another object of the present disclosure is to provide a mobile robot capable of allowing either one of a leading mobile robot and a following mobile robot to determine a length of trajectory to be followed by the following mobile robot in consideration of the performance of the following mobile robot during follow-up of a plurality of mobile robots, and a control method thereof.

In addition, still yet another object of the present disclosure is to provide a mobile robot capable of allowing either one of a leading mobile robot and a following mobile robot to perform the control of moving start, moving speed and moving stop of the following mobile robot and the leading mobile robot according to a length of trajectory to follow, during follow-up of a plurality of mobile robots, and a control method thereof.

According to the present disclosure, a plurality of mobile robots may send and receive signals to obtain relative positions, and control the moving speeds of the plurality of mobile robots based on a length of the movement trajectory of the leading mobile robot to be followed by the following mobile robot, thereby implementing uninterrupted and flexible follow-up moving.

Here, when a distance of the movement trajectory of the leading mobile robot to be followed by the following mobile robot deviates from a predetermined range, the moving speeds of the following mobile robot or the leading mobile robot may be changed to allow the following mobile robot to follow the leading mobile robot without missing, thereby achieving more visually stable follow-up control.

Here, the case where the length of the movement trajectory of the leading mobile robot to be followed by the following mobile robot deviates from a predetermined range may denote a criterion for maintaining the length of the trajectory to be followed by the following mobile robot in an appropriate range. Specifically, it may denote a distance range in which the distance of the movement trajectory to follow satisfies a maximum separation distance or less while satisfying a minimum separation distance or more.

The following mobile robot may not follow the movement trajectory of the leading mobile robot out of the predetermined range. In other words, it may be ignored or deleted.

The following mobile robot may move along the movement trajectory of the leading mobile robot while the distance of the movement trajectory to follow satisfies the minimum separation distance or more but does not exceed the maximum separation distance.

When the distance of the trajectory to follow is smaller than the minimum separation distance, the moving speed of the following mobile robot may be reduced or stopped. Furthermore, when the distance of the movement trajectory to follow exceeds the maximum separation distance to reach a critical stop distance, the moving of the leading mobile robot may be stopped.

At this time, since the following mobile robot does not follow the movement trajectory out of the predetermined range, a trajectory closest to a current position on the movement trajectory included in the predetermined range may be followed as a next position. When the distance of the trajectory to be followed by the following mobile robot decreases within the predetermined range, the leading mobile robot may start moving, specifically, from a time point satisfying the maximum separation distance or immediately after the minimum separation distance is satisfied.

Specifically, a mobile robot according to an embodiment of the present disclosure may include a main body, a moving unit configured to move the main body, a communication unit configured to communicate with a second mobile robot that emits a signal, and a controller configured to recognize a position of the second mobile robot using the signal, control the moving unit to follow a trajectory corresponding to a movement of the second mobile robot based on the recognized position, determine whether a length of the trajectory to be followed by the main body deviates from a predetermined range, and, in response to a length of trajectory to be followed by the main body deviating from a predetermined range, output a control command to cause a moving speed of the main body or the second mobile robot to change.

Furthermore, according to an embodiment, the controller may be further configured to determine the length of trajectory to be followed based on positions of a plurality of points forming the trajectory corresponding to the movement of the second mobile robot and a current position of the main body.

Furthermore, according to an embodiment, the controller may be further configured to sense positions of a plurality of points forming the trajectory corresponding to the movement of the second mobile robot, store information corresponding the positions of the plurality of points in a predetermined distance unit, and sense that the length of trajectory to be followed deviates from the predetermined range based on the stored information.

Furthermore, according to an embodiment, the controller may be further configured to control the main body to sequentially follow the plurality of points corresponding to the stored information while the length of trajectory to be followed is maintained within the predetermined range, and delete the stored information after the main body moves to a relevant point.

Furthermore, according to an embodiment, the controller may further be configured to, in response to the length of trajectory to be followed by the main body increasing beyond the predetermined range, output a control command to cause the second mobile robot to reduce a movement speed.

Furthermore, according to an embodiment, the controller may further be configured to, in response to the length of trajectory to be followed by the main body exceeding the predetermined range and reaching a critical stop distance, output a control command to cause the second mobile robot to stop from moving.

Furthermore, according to an embodiment, the controller may further be configured to, in response to the length of trajectory to be followed by the main body decreasing below the predetermined range, output a control command to cause the main body to stop from moving.

Furthermore, according to an embodiment, the controller may be further configured to monitor a separation distance between the main body and the second mobile robot using the recognized position, and, in response to the separation distance between the main body and the another mobile robot decreasing below the predetermined range while the length of trajectory to be followed by the main body is maintained within the predetermined range, output a control command to cause a movement speed of the second mobile robot to reduce a movement speed.

Furthermore, according to an embodiment, the controller may further be configured to, in response to the length of trajectory to be followed by the main body increasing beyond the predetermined range, control a movement of the main body to follow a point close to a current position of the main body among a plurality of points forming the trajectory within the predetermined range.

Furthermore, according to an embodiment, the controller may further be configured to, in response to the length of trajectory to be followed by the main body decreasing below the predetermined range, control a movement of the main body to follow a plurality of points forming the trajectory corresponding to the movement of the second mobile robot at a current position of the main body.

Furthermore, according to an embodiment, the controller may further be configured to, in response to the length of trajectory to be followed by the main body increasing to the predetermined range while performing the motion, control a movement of the main body to end a motion and follow a point close to the current position of the main body among the plurality of points.

In addition, a plurality of mobile robots according to an embodiment of the present disclosure may comprise a plurality of mobile robots including a first mobile robot and a second mobile robot. The first mobile robot may be configured to communicate with the second mobile robot that sends a signal to recognize a position of the second mobile robot, control the second mobile robot to follow a trajectory corresponding to a movement of the first mobile robot based on the recognized position, and, in response to a length of the trajectory to be followed by the second mobile robot deviating from a predetermined range, output a control command to cause a movement speed of the first mobile robot or the second mobile robot to change. The second mobile robot may be configured to communicate with the first mobile robot that sends a signal to sense a plurality of points forming the trajectory corresponding to the movement of the first mobile robot, and sequentially follow the sensed plurality of points. The first mobile robot may be configured to output a control command to change a movement speed of the first mobile robot or the second mobile robot when a length of trajectory to be followed by the second mobile robot deviates from a predetermined range.

Furthermore, according to an embodiment, the first mobile robot may be further configured to determine a length of the trajectory to be followed by the second mobile robot based on positions of the plurality of points forming a trajectory corresponding to the movement of the first mobile robot and a relative position of the second mobile robot.

Furthermore, according to an embodiment, the second mobile robot may further be configured to store information corresponding to positions of the plurality of sensed points in a predetermined distance unit, and the first mobile robot may further be configured to sense that the length of trajectory to follow deviates from a predetermined range based on the information stored in the second mobile robot, and the second mobile robot may be further configured to sequentially move based on the stored information, and delete information corresponding to the moved points while the length of trajectory to follow satisfies the predetermined range.

In addition, there is provided a method of controlling a mobile robot according to an embodiment of the present disclosure, the method may include allowing a main body of a first mobile robot to communicate with a second mobile robot that sends a signal to recognize a relative position of the second mobile robot, controlling a movement of the main body of the first mobile robot to follow a trajectory corresponding to a movement of the second mobile robot based on the recognized relative position, allowing the main body of the first mobile robot to sense that a length of the trajectory of the second mobile robot to follow deviates from a predetermined range, and outputting a control command to change a movement speed of the main body or the second mobile robot in response to the sensed deviation.

Furthermore, according to an embodiment, in response to the length of trajectory to be followed by the main body increasing beyond the predetermined range, outputting a control command to cause the second mobile robot to reduce a movement speed.

Furthermore, according to an embodiment, in response to the length of trajectory to be followed by the main body exceeding the predetermined range and reaching a critical stop distance, outputting outputting a control command to cause the second mobile robot to stop.

Furthermore, according to an embodiment, in response to the length of trajectory to be followed by the main body decreasing below the predetermined range, outputting a control command to cause the main body to stop.

As described above, according to a mobile robot and a control method thereof according to an embodiment of the present disclosure, the following cleaner may perform cleaning without any interruption while following the leading cleaner without through a server.

Furthermore, follow-up moving of the follower cleaner may be controlled on the basis of a length of a trajectory to be actually followed by the follower cleaner during follow-up of a plurality of robot cleaners thereby performing efficient follow-up control without collision or delay even in an exceptional situation where the moving directions of the head cleaner and the follower cleaner are different or they should avoid each other, and a control method thereof.

Furthermore, the moving of the head cleaner and the follower cleaner may be controlled in consideration of both a length of trajectory to be actually followed by the follower cleaner and a separation distance between a plurality of robot cleaners during follow-up of the plurality of robot cleaners.

In addition, when the length of the trajectory to be followed by the follower cleaner decreases, the movement speed of the follower cleaner may be reduced or the trajectory of the head cleaner may be followed in place, and when the length of the trajectory to be followed by the follower cleaner increases, the movement speed of the head cleaner decreases or stops, thereby performing visually stable follow-up control while the follower cleaner follows the head cleaner without missing it.

BRIEF DESCRIPTION OF THE DRAWING

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Hereinafter, a mobile robot according to the present disclosure will be described in detail with reference to the accompanying drawings.

Hereinafter, description will be given in detail of embodiments disclosed herein. Technical terms used in this specification are merely used for explaining specific embodiments, and should not be constructed to limit the scope of the technology disclosed herein.

First, the term "mobile robot" disclosed herein may be used as the same meaning as "robot (for a specific function)," "robot cleaner," "robot for cleaning" and "autonomous cleaner," and those terms will be used equally.

Furthermore, the term "a plurality of mobile robots" disclosed in the present disclosure may be used as "a plurality of robot cleaners" or "a plurality of cleaners". Furthermore, the term a "first mobile robot" may be named a "first robot", a "first robot cleaner", a "first cleaner", or a "leading cleaner". Furthermore, a "second mobile robot" may be named a "second robot", a "second robot cleaner", a "second cleaner", or a "following cleaner".

Figure 1:
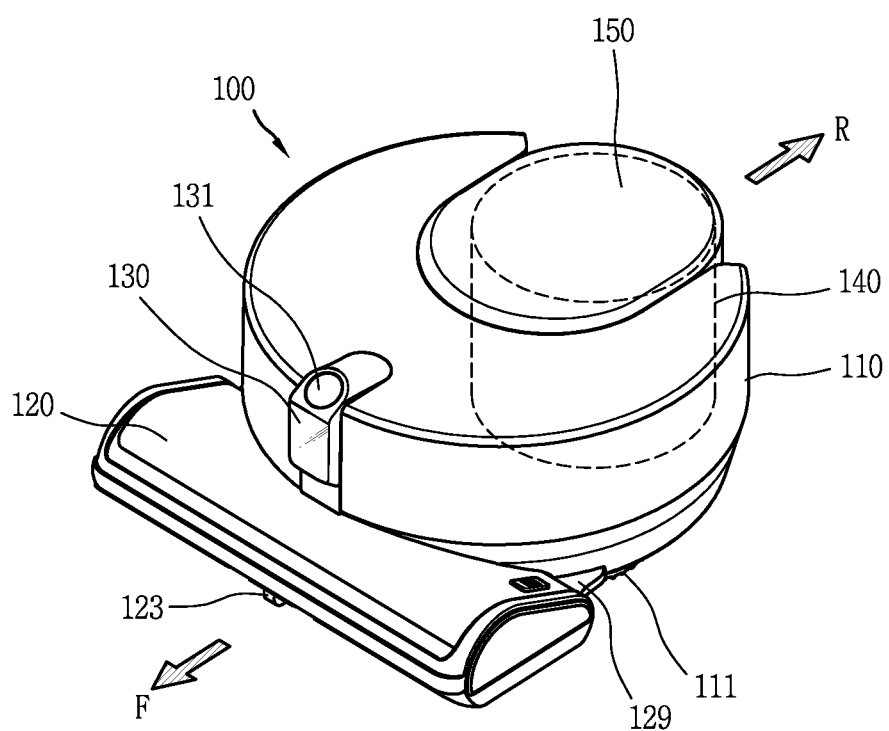
FIG. 1 is a perspective view showing an example of a mobile robot according to an embodiment of the present disclosure.
Figure 2:
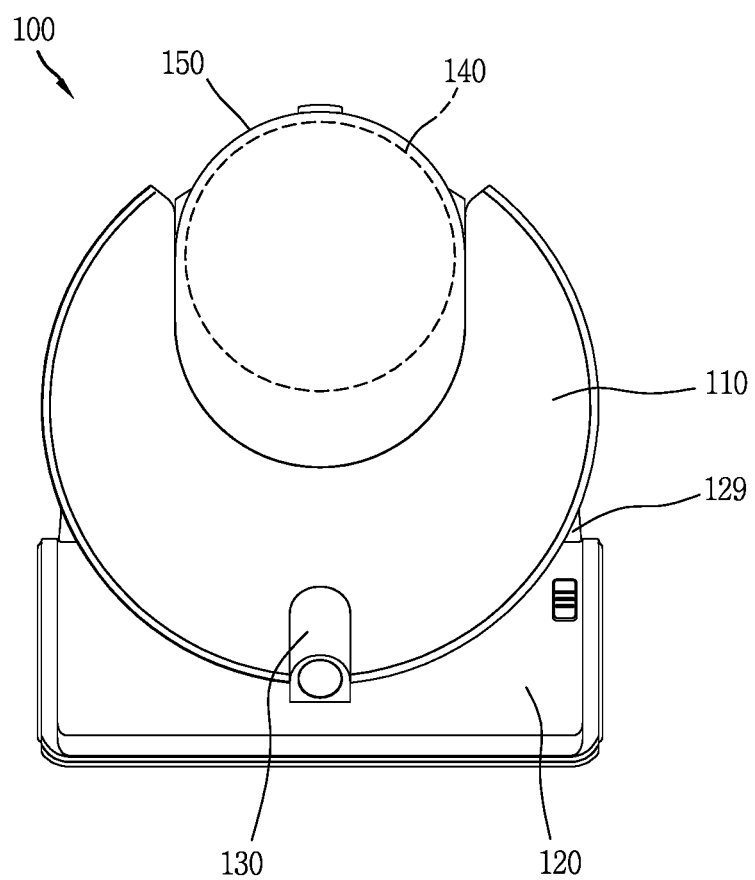
FIG. 2 is a plan view of the mobile robot illustrated in FIG. 1 according to an embodiment of the present disclosure.
Figure 3:
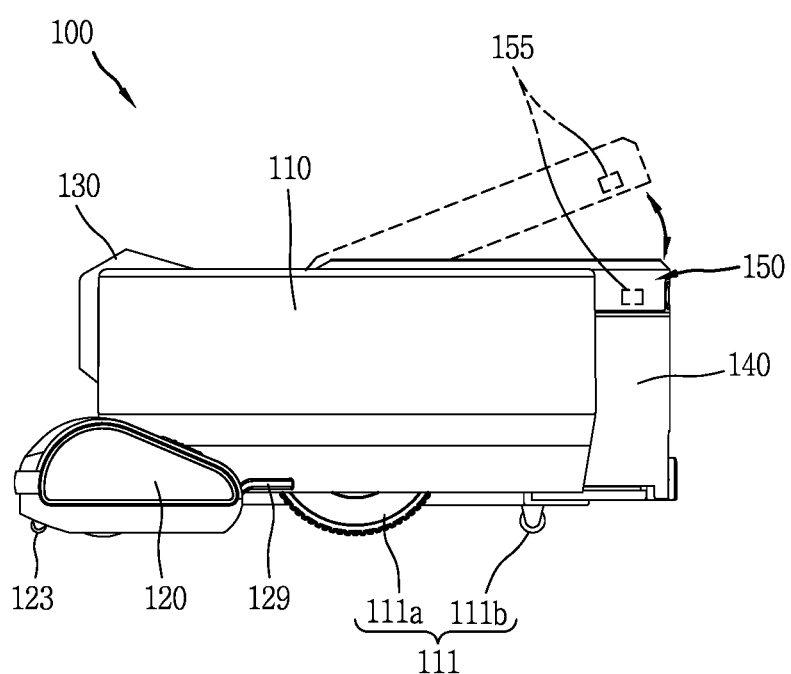
FIG. 3 is a side view of the mobile robot illustrated in FIG. 1 according to an embodiment of the present disclosure.

FIGS. 1 to 3 illustrate a robot cleaner as an example of a mobile robot according to the present disclosure.

Specifically, FIG. 1 is a perspective view showing an example of a mobile robot 100 according to the present disclosure, and FIG. 2 is a plan view of the mobile robot 100 illustrated in FIG. 1, and FIG. 3 is a side view of the mobile robot 100 illustrated in FIG. 1.

In this disclosure, a mobile robot, a robot cleaner, and a cleaner that performs autonomous moving may be used in the same sense. Furthermore, in this disclosure, a plurality of cleaners described as an example of a plurality of mobile robots may include at least part of configurations illustrated in FIGS. 1 to 3.

Referring to FIGS. 1 through 3, the robot cleaner 100 performs a function of cleaning a floor while moving on a predetermined area by itself. Cleaning of a floor mentioned here includes, for example, sucking dust (including foreign matter) on the floor or mopping the floor.

The robot cleaner 100 may include a cleaner main body 110, a cleaning unit 120, a sensing unit 130, and a dust container 140.

The cleaner main body 110 may comprise various components in addition to a controller (not illustrated) for controlling the robot cleaner 100. In addition, the cleaner main body 110 may comprise a wheel unit 111 for the moving of the robot cleaner 100. The robot cleaner 100 may move forward, backward, left and right by the wheel unit 111.

Referring to FIG. 3, the wheel unit 111 may include main wheels 111a and a sub wheel 111b.

The main wheels 111a may be provided on both sides of the cleaner main body 110 and may be configured to be rotatable in one direction or another direction according to a control signal of the controller. Each of the main wheels 111a may be configured to be drivable independently from each other. For example, each main wheel 111a may be driven by a different motor. Alternatively, each main wheel 111a may be driven by a plurality of different axes provided in one motor.

The sub wheel 111b may be configured to support the cleaner body 110 along with the main wheel 111a and assist the moving of the robot cleaner 100 by the main wheel 111a. The sub wheel 111b may also be provided on a cleaning unit 120 to be described later.

The controller may be configured to control the driving of the wheel unit 111 in such a manner that the robot cleaner 100 autonomously moves on the floor.

Meanwhile, a battery (not shown) for supplying power to the robot cleaner 100 may be mounted to the cleaner body 110. The battery may be configured to be rechargeable, and may be configured to be detachable from a bottom portion of the cleaner body 110.

In FIG. 1, a cleaning unit 120 may be disposed in a protruding form from one side of the cleaner main body 110, so as to suck air containing dust or mop an area. The one side may be a side where the cleaner main body 110 moves in a forward direction (F), that is, a front side of the cleaner main body 110.

The cleaning unit 120 may have a shape protruding from one side of the cleaner main body 110 to front and both left and right sides. Specifically, a front end portion of the cleaning unit 120 may be disposed at a position spaced forward apart from the one side of the cleaner main body 110, and left and right end portions of the cleaning unit 120 may be disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The vacant space may be a space between both left and right end portions of the cleaner body 110 and both left and right end portions of the cleaning unit 120, and may have a shape recessed in an inward direction of the robot cleaner 100.

When an obstacle is caught in the vacant space, the robot cleaner 100 may be blocked by an obstacle not to move. In order to prevent this, a cover member 129 may be disposed to cover at least part of the vacant space.

The cover member 129 may be provided on the cleaner main body 110 or the cleaning unit 120. According to the present embodiment, the cover member 129 may be formed in a protruding manner on both sides of a rear end portion of the cleaning unit 120, and disposed to cover an outer peripheral surface of the cleaner body 110.

The cover member 129 may be disposed to fill at least part of the empty space, that is, the empty space between the cleaner main body 110 and the cleaning unit 120. This may result in realizing a structure capable of preventing an obstacle from being caught in the empty space, or a structure capable of easily escaping an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to a collision with an obstacle, a part of the impact may be transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. In other words, as the cover member 129 is disposed to cover the outer circumferential surface of the cleaner main body 110, a relative position of the cleaning unit 120 with respect to the cleaner main body 110 may be determined.

The cleaning unit 120 may be provided with a castor 123. The castor 123 may be configured to assist the moving of the robot cleaner 100, and also support the robot cleaner 100.

The cleaner main body 110 may be provided with the sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an vertical direction of the cleaner main body 110. The sensing unit 130 may be disposed at an upper portion of the cleaning unit 120 to sense an obstacle or geographic feature in front of the robot cleaner 100 so that the cleaning unit 120 positioned at the forefront of the robot cleaner 100 does not collide with the obstacle.

The sensing unit 130 may be configured to additionally perform a sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the controller, and for example, the camera 131 may transmit an electrical signal corresponding to an upward image to the controller. The electrical signal corresponding to the upward image may be used by the controller to detect the position of the cleaner main body 110.

In addition, the sensing unit 130 may detect obstacles such as walls, furniture, and cliffs on a moving surface or a moving path of the robot cleaner 100. Also, the sensing unit 130 may sense presence of a docking device that performs battery charging. Also, the sensing unit 130 may detect ceiling information so as to map a moving area or a cleaning area of the robot cleaner 100.

The cleaner main body 110 may be provided with a dust container 140 detachably coupled thereto for separating and collecting dust from sucked air.

The dust container 140 may be provided with a dust container cover 150 which may cover the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 may protrude toward the rear of the cleaner main body 110 (i.e., a reverse direction (R) opposite a forward direction (F)).

The dust container 140 may be provided with an inlet through which air containing dust may be introduced and an outlet through which air separated from dust may be discharged. The inlet and the outlet may communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 may flow into the dust container 140 through the intake passage inside the cleaner main body 110 and the air may be separated from the dust while passing through a filter and cyclone of the dust container 140. Dust may be collected in the dust box 140, and air may be discharged from the dust box 140 and then discharged to the outside through the discharge port 112 in the cleaner body 110 and finally through the discharge port 112.

An embodiment related to the components of the robot cleaner 100 will be described below with reference to FIG. 4.

The robot cleaner 100 or the mobile robot according to an embodiment of the present disclosure may include a communication unit 1100, an input unit 1200, a moving unit 1300, a sensing unit 1400, an output unit 1500, a power supply unit 1600, a memory 1700, a controller 1800, and a cleaning unit 1900, or a combination thereof.

Figure 4:
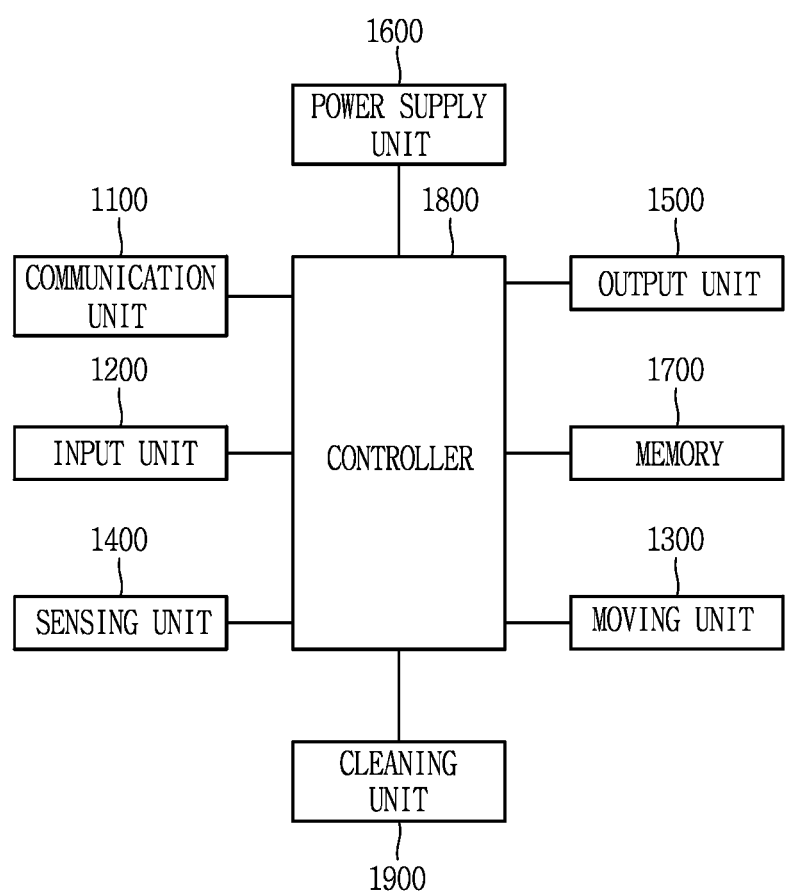
FIG. 4 is a block diagram showing exemplary components of a mobile robot according to an embodiment of the present disclosure.

Here, a robot cleaner having more or fewer components than shown in FIG. 4 may be implemented. Also, as described above, each of a plurality of robot cleaners described in the present disclosure may equally include only some of components to be described below. In other words, a plurality of robot cleaners may include different components.

Hereinafter, each component will be described.

First, the power supply unit 1600 may comprise a battery that can be charged by an external commercial power supply, and may supply power to the mobile robot. The power supply unit 1600 may supply driving power to each of the components included in the mobile robot to supply operating power required for the mobile robot to move or perform a specific function.

Here, the controller 1800 may sense the remaining power of the battery, and control the battery to move power to a charging base connected to the external commercial power source when the remaining power is insufficient, and thus a charge current may be supplied from the charging base to charge the battery. The battery may be connected to a battery sensing unit, and a battery remaining amount and a charging state may be delivered to the controller 1800. The output unit 1500 may display the remaining battery level under the control of the controller.

The battery may be located in a lower portion of the center of the robot cleaner or may be located at either one of the left or right sides. In the latter case, the mobile robot may further include a balance weight for eliminating a weight bias of the battery.

The controller 1800 may perform a role of processing information based on an artificial intelligence technology and may include at least one module for performing at least one of learning of information, inference of information, perception of information, or processing of a natural language.

The controller 1800 may use a machine learning technology to perform at least one of learning, inference or processing of a large amount of information (big data), such as information stored in the cleaner, environment information around the cleaner, information stored in a communicable external storage, and the like. Furthermore, the controller 1800 may predict (or infer) at least one executable operation of the cleaner based on information learned using the machine learning technology, and control the cleaner to execute the most feasible operation among the at least one predicted operation.

The machine learning technology may be a technology that collects and learns a large amount of information based on at least one algorithm, and determines and predicts information based on the learned information. The learning of information may be an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, or the like.

As one field of the machine learning technology, deep learning may be a technology of performing at least one of learning, determining, and processing information using a deep neural network (DNN) algorithm. The deep neural network (DNN) may have a structure of linking layers and transferring data between the layers. This deep learning technology may be employed to learn a vast amount of information through the deep neural network (DNN) using a graphic processing unit (GPU) optimized for parallel computing.

The controller 1800 may use training data stored in an external server or a memory, and may include a learning engine for detecting a characteristic for recognizing a predetermined object. Here, characteristics for recognizing an object may include the size, shape, and shade of the object.

Specifically, when the controller 1800 inputs a part of images acquired through the camera provided on the cleaner into the learning engine, the learning engine may recognize at least one object or organism included in the input images.

When the learning engine is applied to a movement of the cleaner, the controller 1800 can recognize whether or not an obstacle such as a chair leg, a fan, and a specific shape of balcony gap, which obstruct the running of the cleaner, exists around the cleaner. This may result in enhancing efficiency and reliability of the moving of the cleaner.

On the other hand, the learning engine may be mounted to the controller 1800 or on an external server. When the learning engine is mounted to an external server, the controller 1800 may control the communication unit 1100 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the moving unit 1300 may comprise a motor, and the moving unit 1300 may operate the motor to bidirectionally rotate left and right main wheels, so that the main body can rotate or move. At this time, the left and right main wheels may be independently moved. The moving unit 1300 may advance the main body of the mobile robot forward, backward, left, right, curvedly, or in place.

Meanwhile, the input unit 1200 may receive various control commands for the robot cleaner from the user. The input unit 1200 may comprise one or more buttons, for example, the input unit 1200 may include an OK button, a set button, and the like. The OK button may be a button for receiving a command for confirming sensing information, obstacle information, position information, and map information from the user, and the set button may be a button for receiving a command for setting the information from the user.

In addition, the input unit 1200 may comprise an input reset button for canceling a previous user input and receiving a user input again, a delete button for deleting a preset user input, a button for setting or changing an operation mode, a button for receiving a command to be restored to the charging base, or the like.

Furthermore, the input unit 1200, such as a hard key, a soft key, a touch pad, or the like, may be installed on an upper portion of the mobile robot. In addition, the input unit 1200 may have a form of a touch screen along with the output unit 1500.

On the other hand, the output unit 1500 may be installed on an upper portion of the mobile robot. Of course, the installation position and installation type may vary. For example, the output unit 1500 may display a battery state, a moving mode, or the like on the screen.

In addition, the output unit 1500 may output state information inside the mobile robot detected by the sensing unit 1400, for example, a current state of each configuration included in the mobile robot. Moreover, the output unit 1500 may display external state information, obstacle information, position information, map information, or the like detected by the sensing unit 1400 on the screen. The output unit 1500 may be formed with any one of a light emitting diode (LED), a liquid crystal display (LCD), a plasma display panel, or an organic light emitting diode (OLED).

The output unit 1500 may further include a sound output device for audibly outputting an operation process or an operation result of the mobile robot performed by the controller 1800. For example, the output unit 1500 may output a warning sound to the outside in accordance with a warning signal generated by the controller 1800.

In this case, the audio output module (not shown) may comprise, for example, a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure may output environment information on a moving area on the screen or output it as sound. According to another embodiment, the mobile robot may transmit map information or environment information to a terminal device through the communication unit 1100 to output a screen or sound to be output through the output unit 1500.

The memory 1700 may store a control program for controlling or driving the robot cleaner and the resultant data. The memory 1700 may store audio information, image information, obstacle information, position information, map information, and the like. Furthermore, the memory 1700 may store information related to a moving pattern.

The memory 1700 may comprise a nonvolatile memory. Here, the non-volatile memory (NVM, NVRAM) may be a storage device capable of continuously storing information even when power is not supplied thereto, and for an example, the non-volatile memory may be a ROM, a flash memory, a magnetic computer storage device (e.g., a hard disk, a diskette drive, a magnetic tape), an optical disk drive, a magnetic RAM, a PRAM, or the like.

Meanwhile, the sensing unit 1400 may comprise at least one of an external signal detection sensor, a front detection sensor, a cliff detection sensor, a two-dimensional camera sensor, and a three-dimensional camera sensor.

The external signal detection sensor may sense an external signal of the mobile robot. The external signal detection sensor may be, for example, an infrared ray sensor, an ultrasonic sensor, a radio frequency (RF) sensor, or the like.

The mobile robot may receive a guide signal generated by the charging base using the external signal detection sensor to check the position and direction of the charging base. At this time, the charging base may transmit a guide signal indicating the direction and the distance to allow the mobile robot to return. In other words, the mobile robot may receive a signal transmitted from the charging base to determine a current position, set a moving direction, and return to the charging base.

On the other hand, the front detection sensor may be installed at predetermined intervals at a front side of the mobile robot, specifically along a lateral outer circumferential surface of the mobile robot. The front sensor may be located on at least one side surface of the mobile robot to detect an obstacle in front of the mobile robot. The front sensor may detect an object, especially an obstacle, existing in a moving direction of the mobile robot and transmit detection information to the controller 1800. In other words, the front sensor may detect protrusions on the moving path of the mobile robot, household appliances, furniture, walls, wall corners, or the like, and may transmit the information to the controller 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be used to sense a distant obstacle in general. The ultrasonic sensor may include a transmitter and a receiver, and the controller 1800 may determine whether or not there exists an obstacle based on whether or not ultrasonic waves radiated through the transmitter is reflected by the obstacle or the like and received at the receiver, and may calculate a distance to the obstacle using the ultrasonic emission time and ultrasonic reception time.

Furthermore, the controller 1800 may compare ultrasonic waves emitted from the transmitter and ultrasonic waves received at the receiver to detect information related to a size of the obstacle. For example, the controller 1800 may determine that the larger the obstacle is, the more ultrasonic waves are received at the receiver.

In one embodiment, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

In other words, the transmitters may be spaced apart from the front center of the main body to the left and right sides, and one or two (or more) transmitters may be disposed between the receivers to form a receiving area of ultrasonic signals reflected from an obstacle or the like. With this arrangement, the receiving area may be expanded while reducing the number of sensors. A transmission angle of ultrasonic waves may maintain a range of angles that do not affect different signals to prevent a crosstalk phenomenon. Furthermore, the receiving sensitivities of the receivers may be set to be different from each other.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor or the like.

For example, the front detection sensor may include an infrared sensor as a different type of sensor other than the ultrasonic sensor.

The infrared sensor may be installed on an outer circumferential surface of the mobile robot together with the ultrasonic sensor. The infrared sensor may also sense an obstacle existing at the front or the side to transmit obstacle information to the controller 1800. In other words, the infrared sensor may sense a protrusion on the moving path of the mobile robot, a household appliance, a furniture, a wall, a wall corner, or the like, and transmit the information to the controller 1800. Therefore, the mobile robot may move within a specific region without collision with the obstacle.

On the other hand, a cliff detection sensor (or cliff sensor) may sense an obstacle on the floor supporting the main body of the mobile robot using various types of optical sensors.

In other words, the cliff detection sensor may be installed on a rear surface of the bottom mobile robot, but may of course be installed in a different position depending on the type of the mobile robot. The cliff detection sensor may be a sensor located on a back surface of the mobile robot to sense an obstacle on the floor, and the cliff detection sensor may be an infrared sensor, an ultrasonic sensor, an RF sensor, a PSD (Position Sensitive Detector) sensor, or the like, which may be provided with a transmitter and a receiver such as the obstacle detection sensor.

For an example, any one of the cliff detection sensors may be installed in front of the mobile robot, and the other two cliff detection sensors may be installed relatively behind the mobile robot.

For example, the cliff detection sensor may be a PSD sensor, but may also be a plurality of different kinds of sensors.

The PSD sensor may detect a short and long-distance position of incident light with one p-n junction using a semiconductor surface resistance. The PSD sensor may include a one-dimensional PSD sensor that detects light only in one axial direction, and a two-dimensional PSD sensor that detects a light position on a plane. Both of the PSD sensors may have a pin photodiode structure. The PSD sensor may be a type of infrared sensor that uses infrared rays to transmit infrared rays and then measures an angle of infrared rays reflected from and returned back to an obstacle so as to measure a distance. In other words, the PSD sensor may calculate a distance from the obstacle by using the triangulation method.

The PSD sensor may comprise a light emitter that emits infrared rays to an obstacle and a light receiver that receives infrared rays that are reflected and returned from the obstacle, and may be configured typically as a module type. When an obstacle is detected by using the PSD sensor, a stable measurement value may be obtained irrespective of reflectivity and color difference of the obstacle.

The cleaning unit 1900 may clean a designated cleaning area according to a control command transmitted from the controller 1800. The cleaning unit 1900 may scatter dust in the vicinity through a brush (not shown) that scatters dust in a designated cleaning area, and then may drive the suction fan and the suction motor to suck the scattered dust. In addition, the cleaning unit 1900 may perform mopping in a designated cleaning area according to the replacement of the configuration.

Furthermore, the controller 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the controller 1800 may determine whether to pass a cliff or not according to a ground state of the detected cliff by using the cliff detection sensor, and decide whether to pass the cliff or not according to the determination result. For example, the controller 1800 may determine presence or non-presence of a cliff and a depth of the cliff through the cliff sensor, and then allow the mobile robot to pass through the cliff only when a reflection signal is detected through the cliff sensor.

As another example, the controller 1800 may also determine lifting of the mobile robot using the cliff sensor.

On the other hand, the two-dimensional camera sensor may be provided on one side of the mobile robot to acquire image information related to the surroundings of the main body during movement.

An optical flow sensor may convert a downward image input from an image sensor provided in the sensor to generate image data in a predetermined format. The generated image data may be stored in the memory 1700.

Furthermore, one or more light sources may be installed adjacent to the optical flow sensor. The one or more light sources may irradiate light to a predetermined region of the bottom surface captured by the image sensor. In other words, when the mobile robot moves in a specific region along the bottom surface, a predetermined distance may be maintained between the image sensor and the bottom surface when the bottom surface is flat. On the other hand, when the mobile robot moves on a bottom surface having a nonuniform surface, the robot may move away from the bottom surface by more than a predetermined distance due to the irregularities of the bottom surface and obstacles. At this time, the one or more light sources may be controlled by the controller 1800 to adjust an amount of light to be irradiated. The light source may be a light emitting device capable of controlling the amount of light, for example, a light emitting diode (LED) or the like.

Using the optical flow sensor, the controller 1800 may detect a position of the mobile robot irrespective of the slip of the mobile robot. The controller 1800 may compare and analyze the image data captured by the optical flow sensor over time to calculate the moving distance and the moving direction, and calculate the position of the mobile robot on the basis of the moving distance and the moving direction. Using image information on a bottom side of the mobile robot using the optical flow sensor, the controller 1800 may perform slip-resistant correction on the position of the mobile robot calculated by another device.

The three-dimensional camera sensor may be attached to one side or a part of the main body of the mobile robot to generate three-dimensional coordinate information related to the surroundings of the main body.

In other words, the three-dimensional camera sensor may be a 3D depth camera that calculates a near and far distance of the mobile robot and an object to be captured.

Specifically, the three-dimensional camera sensor may capture a two-dimensional image related to the surroundings of the main body, and generate a plurality of three-dimensional coordinate information corresponding to the captured two-dimensional image.

In one embodiment, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another embodiment, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor may be configured to irradiate a laser beam in the form of extending in at least one direction. In one example, the three-dimensional camera sensor may include first and second lasers, wherein the first laser may irradiate a linear shaped laser intersecting each other, and the second laser may irradiate a single linear shaped laser. According to this, the lowermost laser may be used to sense obstacles in the bottom portion, the uppermost laser may be used to sense obstacles in the upper portion, and the intermediate laser between the lowermost laser and the uppermost laser may be used to sense obstacles in the middle portion.

On the other hand, the communication unit 1100 may be connected to a terminal device and/or another device (also referred to as "home appliance" herein) through one of wired, wireless and satellite communication methods, so as to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like. The another device may also be a device for controlling a door, a window, a water supply valve, a gas valve, or the like. The another device may be a sensor for sensing temperature, humidity, air pressure, gas, or the like.

Further, the communication unit 1100 may communicate with another robot cleaner 100 located in a specific area or within a predetermined range.

Figure 5A:
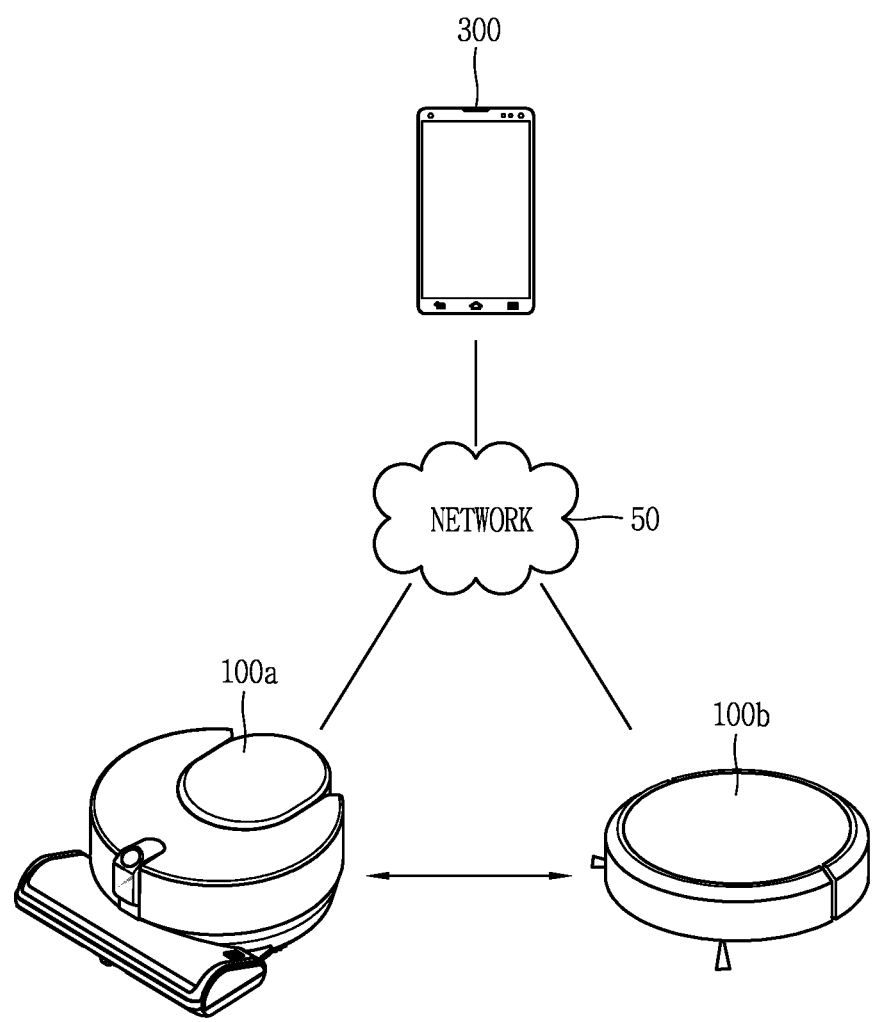
FIG. 5A is a conceptual view illustrating network communication between a plurality of mobile robots according to an embodiment of the present disclosure.
Figure 5B:
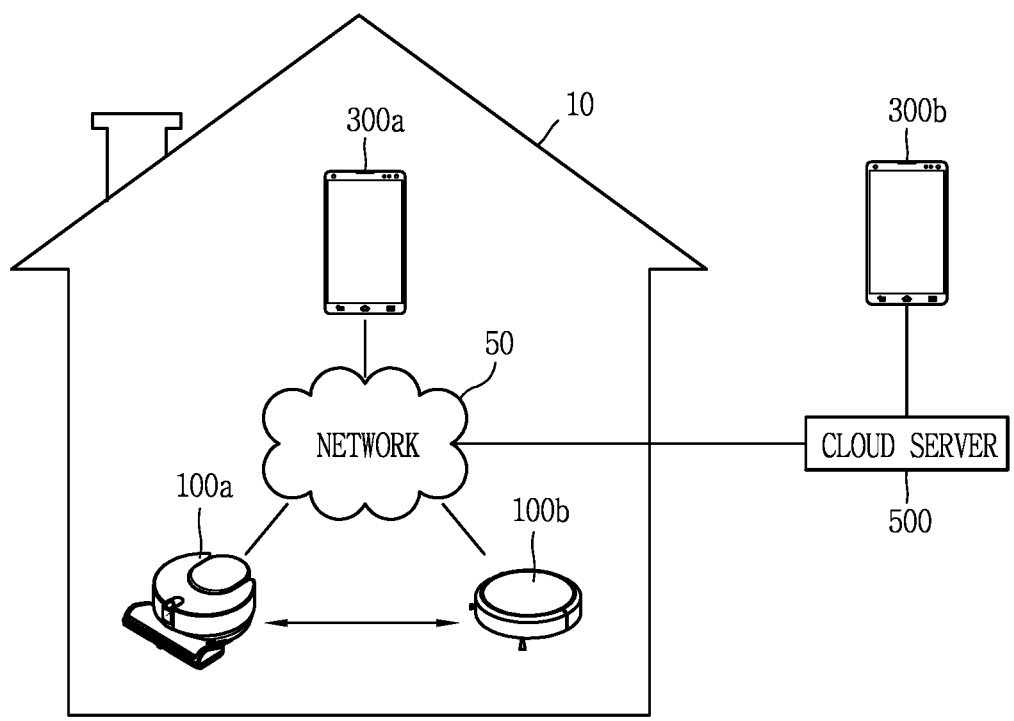
FIG. 5B is a conceptual view illustrating an example of the network communication of FIG. 5A according to an embodiment of the present disclosure.

Referring to FIGS. 5A and 5B, a first cleaner 100*a* and a second cleaner 100*b* that perform autonomous moving may exchange data with each other through network communication 50. In addition, the first cleaner 100*a* and/or the second cleaner 100*b* that perform autonomous moving may perform a cleaning related operation or a corresponding operation by a control command received from a terminal 300 through the network communication 50 or other communication.

In other words, although not shown, a plurality of cleaners 100*a*, 100*b* that perform autonomous moving may also communicate with the terminal 300 through a first network communication and communicate with each other through a second network communication.

Here, the network communication 50 may refer to short-range communication using at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), or the like.

The network communication 50 may vary depending on a communication mode of the robot cleaners desired to communicate with each other.

In FIG. 5A, the first cleaner 100a and/or the second cleaner 100b that perform autonomous moving may provide information sensed by the respective sensing units thereof to the terminal 300 through the network communication 50. The terminal 300 may also transmit a control command generated based on the received information to the first cleaner 100a and/or the second cleaner 100b via the network communication 50.

In FIG. 5A, the communication unit of the first cleaner 100a and the communication unit of the second cleaner 100b may also directly communicate with each other or indirectly communicate with each other via another router (not shown), to recognize information related to a moving state and positions of counterparts.

In one example, the second cleaner 100b may perform a moving operation and a cleaning operation according to a control command received from the first cleaner 100a. In this case, it may be said that the first cleaner 100a operates as a master and the second cleaner 100b operates as a slave. Alternatively, it may be said that the second cleaner 100b follows the first cleaner 100a. In some cases, it may also be said that the first cleaner 100a and the second cleaner 100b collaborate with each other.

Hereinafter, a system including a plurality of cleaners 100a, 100b performing autonomous moving according to an embodiment of the present disclosure will be described with reference to FIG. 5B.

As illustrated in FIG. 5B, a cleaning system according to an embodiment of the present disclosure may include a plurality of cleaners 100a, 100b performing autonomous moving, a network 50, a server 500, and a plurality of terminals 300a and 300b.

The plurality of cleaners 100a, 100b, the network 50 and at least one terminal 300a may be disposed in a building 10 while another terminal 300b and the server 500 may be located outside the building 10.

The plurality of cleaners 100a, 100b may include cleaners that perform cleaning while moving by themselves, and may perform autonomous moving and autonomous cleaning. Each of the plurality of cleaners 100a, 100b may include a communication unit 1100, in addition to the moving function and the cleaning function.

The plurality of cleaners 100a, 100b, the server 500 and the plurality of terminals 300a and 300b may be connected together through the network 50 to exchange data. To this end, although not shown, a wireless router such as an access point (AP) device and the like may further be provided. In this case, the terminal 300a located in the building (internal network) 10 may access at least one of the plurality of cleaners 100a and 100b through the AP device so as to perform monitoring, remote control or the like with respect to the cleaner. Also, the terminal 300b located in an external network may access at least one of the plurality of cleaners 100a and 100b through the AP device, to perform monitoring, remote control or the like with respect to the cleaner.

The server 500 may be wirelessly connected directly through the terminal 300b. Alternatively, the server 500 may be connected to at least one of the plurality of cleaners 100a and 100b without passing through the mobile terminal 300b.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

The server 500 may store firmware information, operation information (course information and the like) related to the plurality of cleaners 100a, 100b, and may register product information regarding the plurality of cleaners 100a, 100b. For example, the server 500 may be a server operated by a cleaner manufacturer or a server operated by an open application store operator.

In another example, the server 500 may be a home server that is provided in the internal network 10 and stores status information regarding the home appliances or stores contents shared by the home appliances. If the server 500 is a home server, information related to foreign substances, for example, foreign substance images and the like may be stored.

Meanwhile, the plurality of cleaners 100a and 100b may be directly connected to each other wirelessly via Zigbee, Z-wave, Blue-Tooth, Ultra-wide band, or the like. In this case, the plurality of cleaners 100a and 100b may exchange position information and moving information with each other.

At this time, any one of the plurality of cleaners 100a and 100b may be a master cleaner 100a and another may be a slave cleaner 100b. For example, the first cleaner 100a may be a dry cleaner that sucks dust on the cleaning floor, and the second cleaner 100b may be a wet cleaner that mops the floor cleaned by the first cleaner 100a. Furthermore, the structures and specifications of the first cleaner 100a and the second cleaner 100b may be different from each other.

In this case, the first cleaner 100a may control the moving and cleaning of the second cleaner 100b. In addition, the second cleaner 100b may perform moving and cleaning while following the first cleaner 100a. Here, an operation in which the second cleaner 100b follows the first cleaner 100a may refer to an operation in which the second cleaner 100b performs moving and cleaning by following the first cleaner 100a while maintaining a proper distance from the first cleaner 100a.

Figure 5C:
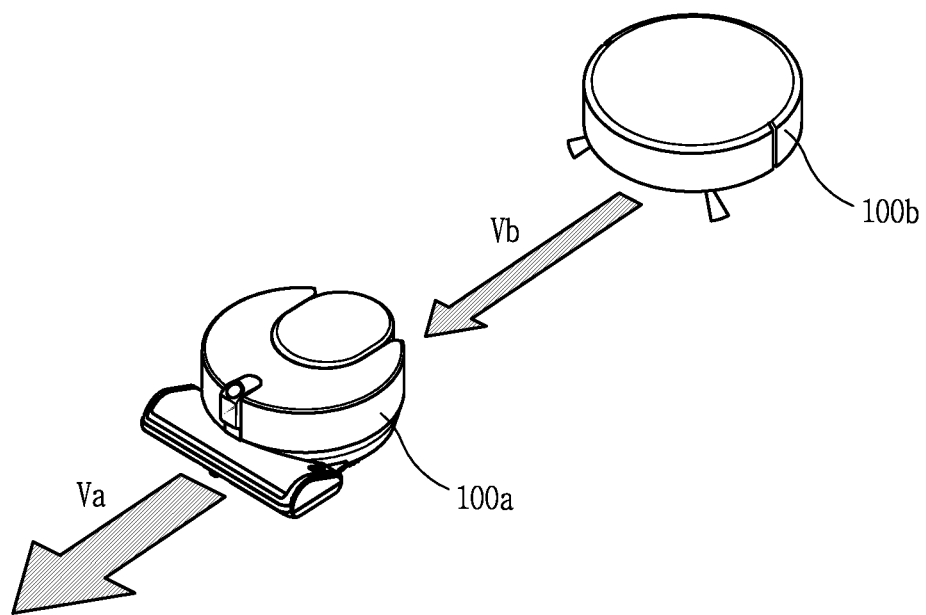
FIG. 5C is a conceptual view illustrating follow-up moving among a plurality of mobile robots according to an embodiment of the present disclosure.

Referring to FIG. 5C, the first cleaner 100a may control the second cleaner 100b such that the second cleaner 100b follows the first cleaner 100a.

For this purpose, the first cleaner 100a and the second cleaner 100b should exist in a specific area where they can communicate with each other, and the second cleaner 100b should recognize at least a relative position of the first cleaner 100a.

For example, the communication unit of the first cleaner 100a and the communication unit of the second cleaner 100b may exchange IR signals, ultrasonic signals, carrier frequencies, impulse signals, or the like, and may analyze them through triangulation, so as to calculate movement displacements of the first cleaner 100a and the second cleaner 100b, thereby recognizing relative positions of the first cleaner 100a and the second cleaner 100b. However, the present disclosure is not limited to this method, and one of the various wireless communication technologies described above may be used to recognize the relative positions of the first cleaner 100a and the second cleaner 100b through triangulation or the like.

When the first cleaner 100a recognizes the relative position with the second cleaner 100b, the second cleaner 100b may be controlled based on map information stored in the first cleaner 100a or map information stored in the server, the terminal or the like. In addition, the second cleaner 100b may share obstacle information sensed by the first cleaner 100a. The second cleaner 100b may perform an operation based on a control command (for example, a control command related to a moving direction, a moving speed, a stop, etc.) received from the first cleaner 100a.

Specifically, the second cleaner 100b may perform cleaning while moving along a moving path of the first cleaner 100a. However, the moving directions of the first cleaner 100a and the second cleaner 100b may not always coincide with each other. For example, when the first cleaner 100a moves or rotates up/down/right/left, the second cleaner 100b may move or rotate up/down/right/left after a predetermined time, and thus current advancing directions of the first and second mobile robot 100a, 100b may differ from each other.

Also, a moving speed (Va) of the first cleaner 100a and a moving speed (Vb) of the second cleaner 100b may be different from each other.

The first mobile robot 100a may control the moving speed (Vb) of the second mobile robot 100b to vary in consideration of a distance at which the first mobile robot 100a and the second mobile robot 100b can communicate with each other. For example, if the first cleaner 100a and the second cleaner 100b move away from each other by a predetermined distance or more, the first cleaner 100a may control the moving speed (Vb) of the second cleaner 100b to be faster than before. On the other hand, when the first cleaner 100a and the second cleaner 100b move close to each other by a predetermined distance or less, the first cleaner 100a may control the moving speed (Vb) of the second cleaner 100b to be slower than before or control the second cleaner 100b to stop for a predetermined time. Accordingly, the second cleaner 100b can perform cleaning while continuously following the first cleaner 100a.

Furthermore, in the present disclosure, receiving sensors may be placed on rear and front sides of the first cleaner 100a to allow the controller of the first cleaner 100a to recognize the receiving direction of an optical signal received from the second cleaner 100b by distinguishing the front and rear sides. To this end, a UWB module may be provided at a rear side of the first cleaner 100a, and a UWB module or a plurality of optical sensors may be spaced apart from a front side of the first cleaner 100a. Alternatively, a single UWB module may be provided in the first cleaner 100a, and a plurality of antennas may be disposed on front, rear, left, and right sides thereof, respectively. The first cleaner 100a may recognize the receiving direction of an optical signal received from the second cleaner 100b to determine whether the second cleaner 100b is coming from the rear side of the first cleaner 100a or located at the front side thereof in a reversed manner.

Figure 6:
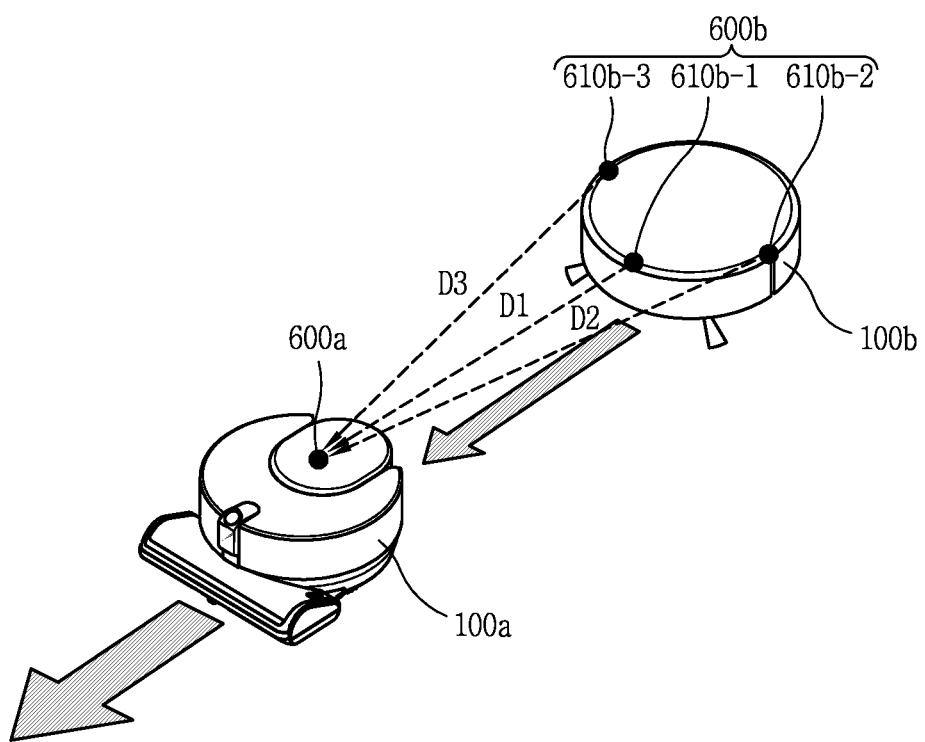
FIG. 6 is a conceptual view illustrating a method of allowing a plurality of mobile robots to determine relative positions to each other.

FIG. 6 shows an example of a method for recognizing relative positions between the first cleaner 100a and the second cleaner 100b. The first cleaner 100a and the second cleaner 100b may respectively send and receive optical signals, and recognize a relative position between each other. Here, the signal may be any one of wireless communication signals using wireless communication technologies such as Zigbee, Z-wave, and Bluetooth, in addition to an ultra-wide band (UWB) signal, an infrared signal, a laser signal, and an ultrasound signal, for example.

Referring to FIG. 6, transmitting sensors (e.g., a UWB sensor, an infrared sensor) and receiving optical sensors (e.g., a UWB sensor, an infrared sensor) may be included to determine relative positions between the first cleaner 100a and the second cleaner 100b. For example, one transmitting optical sensor and three receiving optical sensors may be used, but the number is not limited thereto.

For an example, as illustrated in FIG. 6A, a plurality of sensors 600b may be provided in the second cleaner 100b. For example, the sensors 600b may include a first IR sensor 610b-1, a second IR sensor 610b-2, and a third IR sensor 610-b, and the first through third IR sensors 610b-1, 610b-2, 610b-3 may be mounted to an outer circumferential surface of the main body of the second cleaner 100b, and disposed at different positions.

In this case, the first through third IR sensors 610b-1, 610b-2, 610b-3 may be spaced apart from one another on an outer circumferential surface of the main body of the second cleaner 100b. Meanwhile, the second cleaner 100b may receive a signal output from a sensor 600a provided in the first cleaner 100a through a sensor 600b. Furthermore, the second cleaner 100b may transmit a signal emitted from the sensor 600b to the first cleaner 100a, and the sensor 600a of the first cleaner 100a may receive the signal.

For example, the controller 1800 of the second cleaner 100b may measure intensities of signals, respectively, received at the first through third receiving sensors 610b-1, 610b-2, 610b-3 included in the sensor 600b.

The controller of the second cleaner 100b may apply a triangulation method based on the intensities of the signals measured at the sensors 610b-1, 610b-2, 610b-3.

Describing the triangulation method using the intensities of the signals in brief, the controller of the second mobile robot 100b may calculate a first distance (D1) with respect to the sensor 610b-1 based on the intensity of laser light received at the sensor 610b-1.

At this time, the first distance D1 may be decided by multiplying intensity of laser light by scale, and the scale may be decided through experiments. For example, the radius may be shortened as the intensity of the laser light is great. In other words, the radius and the intensity of the laser light may be inversely proportional to each other.

Similarly, the controller of the second mobile robot 100b may calculate a second distance (D2) with respect to the sensor 610b-2 based on the intensity of a signal received at the sensor 610b-2.

Furthermore, the controller of the second mobile robot 100b may calculate a third distance (D3) with respect to the sensor 610b-3 based on the intensity of a signal received at the sensor 610b-3.

For another example, a method of allowing the first cleaner 100a and the second cleaner 100b to determine relative positions to each other using the UWB module (or UWB sensor) will be described as follows.

The UWB module (or UWB sensor) may be included in the communication units 1100 of the first cleaner 100a and the second cleaner 100b. In view of the fact that the UWB modules are used to sense the relative positions of the first cleaner 100a and the second cleaner 100b, the UWB modules may be included in the sensing units 1400 of the first cleaner 100a and the second cleaner 100b.

For example, the first cleaner 100a may include a UWB module for transmitting ultra-wide band signals. The transmitting UWB module may be referred to as a second type transmitting sensor or a UWB tag-29.

Furthermore, the second cleaner 100b may include a receiving UWB module for receiving ultra-wide band signals output from a transmitting UWB module provided in the first cleaner 100a. The receiving UWB module may be named as a second type receiving sensor or a UWB anchor.

UWB signals transmitted/received between the UWB modules may be smoothly transmitted and received within a specific space.

Accordingly, even if an obstacle exists between the first cleaner 100a and the second cleaner 100b, if the first cleaner 100a and the second cleaner 100b exist within a specific space, they can transmit and receive the UWB signals.

The first cleaner and the second cleaner may measure the time of a signal transmitted and received between the UWB tag and the UWB anchor to determine a separation distance between the first cleaner and the second cleaner.

Specifically, for example, each of the plurality of cleaners 100a, 100b may comprise one UWB sensor, or the first cleaner 100a may comprise a single UWB sensor, and the second cleaner 100b following the first cleaner 100a may comprise a single UWB sensor and at least one antenna or may comprise at least two UWB sensors, so that the first cleaner 100a can measure distances to the second cleaner 100b at two different time points (t1, t2). The UWB sensor of the first cleaner 100a and the UWB sensor of the second cleaner 100b may radiate UWB signals to each other, and may measure distances and relative speed using Time of Arrival (ToA), which is a time that the signals come back by being reflected from the robots. However, the present disclosure is not limited to this, and may recognize the relative positions of the plurality of cleaners 100a, 100b using a Time Difference of Arrival (TDoA) or Angle of Arrival (AoA) positioning technique.

Specifically, description will be given of a method of determining the relative positions of the first cleaner 100a and the second cleaner 100b using an AoA positioning technique. In order to use the AoA (Angle of Arrival) positioning technique, each of the first cleaner 100a and the second cleaner 100b should be provided with one receiver antenna or a plurality of receiver antennas.

The first cleaner 100a and the second cleaner 100b may determine their relative positions using a difference of angles that the receiver antennas provided in the cleaners, respectively, receive signals. To this end, each of the first cleaner 100a and the second cleaner 100b may be able to sense an accurate signal direction coming from the receiver antenna array.

Since signals, for example, UWB signals, generated in the first cleaner 100a and the second cleaner 100b, respectively, may be received only in specific directional antennas, they can determine (recognize) received angles of the signals. Under assumption that positions of the receiver antennas provided in the first cleaner 100a and the second cleaner 100b are known, the relative positions of the first cleaner 100a and the second cleaner 100b may be calculated based on signal receiving directions of the receiver antennas.

At this time, if one receiver antenna is installed, a 2D position may be calculated in a space of a predetermined range. On the other hand, if at least two receiver antennas are installed, a 3D position may be determined. In the latter case, a distance d between the receiver antennas may be used for position calculation in order to accurately determine a signal receiving direction.

On the other hand, in the present disclosure, during follow-up/collaboration between the first cleaner 100a and the second cleaner 100b, the moving of the second cleaner 100b as a follower cleaner may be controlled based on an actual length of a trajectory moved by the first cleaner 100a as a head cleaner.

The first cleaner 100a may move by rotating in a predetermined pattern according to a moving mode or perform cleaning while performing moving in a zigzag manner. Furthermore, the first cleaner 100a may move while changing moving direction according to the shape of cleaning space, the presence of obstacles, the topographic feature of the floor, or the like.

Accordingly, even though the second cleaner 100b follows the first cleaner 100a at the same movement speed, a separation distance between the first cleaner 100a and the second cleaner 100b may increase or decrease depending on the moving of the first cleaner 100a. Alternatively, a separation distance from the first cleaner 100a may be increased depending on the shape of a cleaning space, the presence of obstacles, the topographic feature of the floor, and the like during the follow-up moving of the second cleaner 100b.

In some cases, a separation distance between the first cleaner 100a and the second cleaner 100b may gradually decrease while a distance to be actually followed by the second cleaner 100b may further increase.

In this case, when the follow-up control of the second cleaner 100b is carried out based on the separation distance between the first cleaner 100a and the second cleaner 100b, the distance to be actually followed by the second cleaner 100b may further increase.

This may reduce the visual stability of follow-up/collaboration control for a user and, and in some cases, the first cleaner 100a may stop moving and wait for the second cleaner 100b to prevent follow-up from being interrupted, thereby causing a delay in cleaning time.

Accordingly, in the present disclosure, within a range capable of determining relative positions between the first cleaner 100a and the second cleaner 100b, the follow-up of the second cleaner 100b may be controlled based on a length of actual movement trajectory of the first cleaner 100a.

In this disclosure, the trajectory of movement of the first cleaner 100a may be determined by a method of being transmitted to the second cleaner 100b through the first cleaner 100a. Alternatively, it may be determined by a method of sequentially sensing the trajectory of movement of the first cleaner 100a through the sensor provided in the second cleaner 100b.

Here, the trajectory may refer to a path connecting a plurality of points corresponding to a plurality of positions continuously passed while the first cleaner 100a as a head cleaner moves during cleaning. In addition, the positions of a trajectory may be defined as a plurality of points forming a trajectory, positions of the plurality of points or coordinates corresponding to the positions of the plurality of points.

Hereinafter, the concept of controlling the follow-up of the second cleaner based on a distance of the trajectory of movement of the first cleaner will be described in detail with reference to FIGS. 7A and 7B.

Figure 7A:
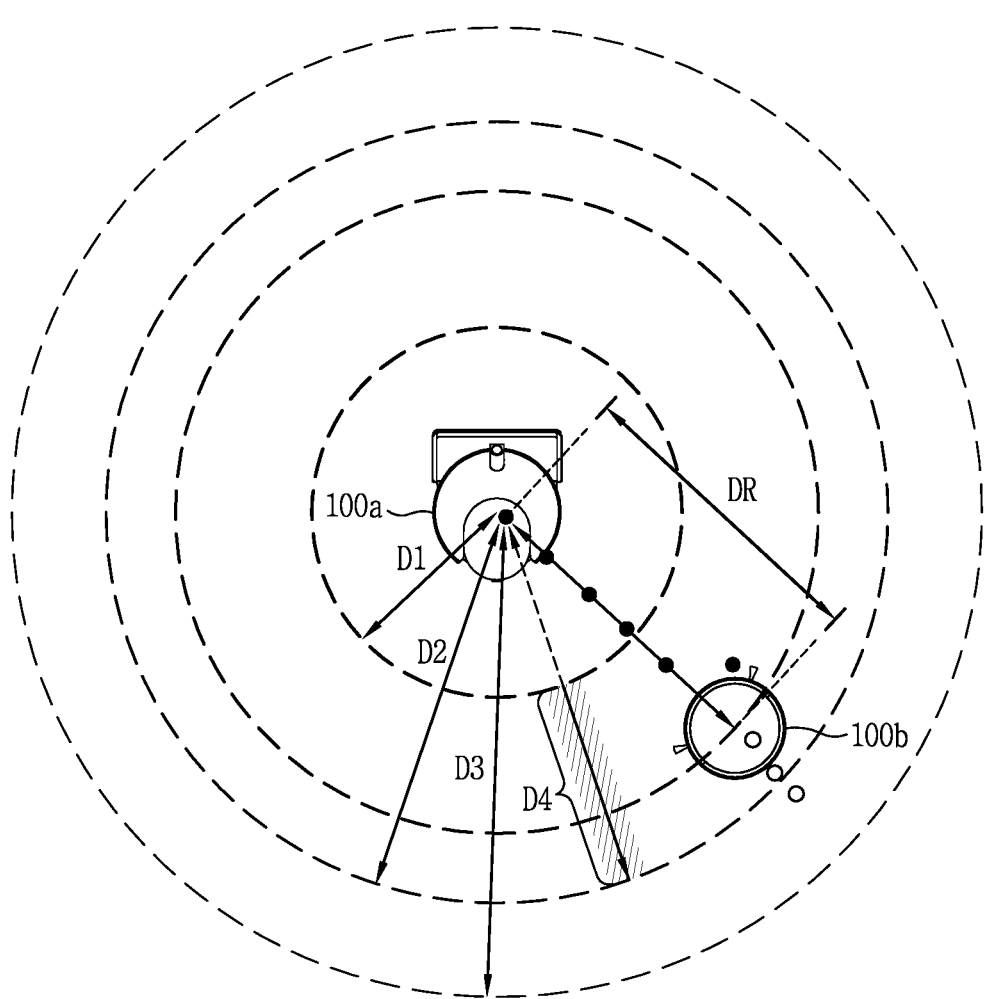
FIG. 7A is a view illustrating follow-up control of a second cleaner based on a distance of the movement trajectory of a first cleaner in a plurality of mobile robots according to an embodiment of the present disclosure.

First, referring to FIG. 7A, the first cleaner 100a a head cleaner may perform cleaning while moving a movable space according to a preset algorithm (e.g., a cleaning algorithm, a moving algorithm).

Furthermore, the first cleaner 100a may control the second cleaner 100b to sequentially follow the positions of the plurality of points passed by the first cleaner 100a, that is, the positions of a trajectory. Alternatively, the second cleaner 100b may sequentially follow the positions of a trajectory passed by the first cleaner by itself.

To this end, the first cleaner 100a may sequentially transmit coordinate information corresponding to the positions of a trajectory passed by the first cleaner 100a to the second cleaner 100b. Alternatively, the second cleaner 100b may sequentially determine the positions of a trajectory corresponding to the movement of the first cleaner 100a through sensors, for example, a UWB sensor and an antenna, provided at a front side thereof.

The second cleaner 100b as a follower cleaner may sequentially move the positions of a plurality of points passed by the first cleaner 100a, that is, the positions of a trajectory.

To this end, the second cleaner 100b may receive coordinate information corresponding to the positions of a trajectory from the first cleaner 100a, and move to a position corresponding to the received coordinate information. Alternatively, the second cleaner 100b may sequentially store the positions of a trajectory corresponding to the movement of the first cleaner 100a through sensors, for example, a UWB sensor and an antenna, provided at a front side thereof, and sequentially follow from a position close to a current position of the second cleaner 100b.

At this time, the first cleaner 100a may control the moving of the first cleaner 100a or the second cleaner 100b such that the length of a trajectory to be followed by the second cleaner 100b does not deviate from a predetermined follow-up distance range.

Here, the length of a trajectory to be followed by the second cleaner 100b may denote a remaining length of moving path for the second cleaner 100b to move along the trajectory of the first cleaner 100a from a current point of the second cleaner 100b to a current point (target point) of the first cleaner 100a.

Therefore, the length of a trajectory to be followed by the second cleaner 100b may have a different concept from a separation distance between the first cleaner 100a and the second cleaner 100b.

However, the first cleaner 100a may control the moving speed such that a separation distance between the first cleaner 100a and the second cleaner 100b is neither too far nor too close even when the length of a trajectory to be followed by the second cleaner 100b does not deviate from a predetermined follow-up distance range.

The length of a trajectory to be followed by the second cleaner 100b may be a length of line connecting a current position of the second cleaner 100b, the passed positions of a trajectory of the first cleaner 100a, and a current position of the first cleaner 100a. The first cleaner 100a and the second cleaner 100b may transmit and receive optical signals to recognize relative positions between the first cleaner 100a and the second cleaner 100b, and thus the current position of the second cleaner 100b and the current position of the first cleaner 100a may be easily determined.

The positions of a trajectory passed by the first cleaner 100a may be obtained by transmitting them to the second cleaner 100b from the first cleaner 100a at predetermined time intervals or at predetermined moving intervals of the first cleaner 100a.

Alternatively, as described above, the second cleaner 100b may obtain the positions of a trajectory corresponding to the movement of the first cleaner 100a located in front through sensors, for example, a UWB sensor and an antenna, provided at a front side thereof in a predetermined distance unit. In this case, the second cleaner 100b may perform rotation to correspond to the moving direction of the first cleaner 100a in order to determine the trajectory of the first cleaner 100a.

There may be a plurality of positions of points forming a trajectory passed by the first cleaner 100a, and the second cleaner 100b may store information corresponding to the plurality of positions of points in a memory or the like. According to the control of the first cleaner 100a, the second cleaner 100b may move while following the plurality of positions of points corresponding to the stored information one by one.

When the first cleaner 100a moves on a curve in order to avoid an obstacle or the like, or when the first cleaner 100a moves while rotating by a predetermined angle according to a moving mode, the length of a trajectory to be followed by the second cleaner 100b may be larger than an actual separation distance between the first cleaner 100a and the second cleaner 100b.

However, when the trajectory to be followed by the second cleaner 100b is only straight moving, the separation distance (DR) between the first cleaner 100a and the second cleaner 100b and the length of the trajectory (a curve connecting black dots shown) to be followed by the second cleaner 100b may be the same.

Therefore, it may be said that the length of the trajectory to be followed by the second cleaner 100b is equal to or greater than the separation distance between the first cleaner 100a and the second cleaner 100b.

In addition, the predetermined follow-up distance range (hereinafter, referred to as "the predetermined range") may denote a reference for maintaining the length of a trajectory to follow by the second cleaner 100b in an appropriate range.

The reason why the length of a trajectory to be followed by the second cleaner 100b is maintained in an appropriate range may be to satisfy stability in both a control aspect such as a case where the first cleaner 100a suddenly stops moving or changes the moving direction and a visual aspect of the follow-up of the second cleaner 100b.

In FIG. 7A, the determined follow-up distance range (D4) may be a distance range satisfying a minimum separation distance (D1) or more as well as satisfying a maximum separation distance (D2) or less.

While the length of the trajectory to be followed by the second cleaner 100b maintains the determined follow-up distance range (D4), the second cleaner 100b may be controlled to follow the positions of a trajectory (black dots shown) passed by the first cleaner 100a. At this time, a trajectory (white dots shown) out of the predetermined follow-up distance range (D4) may be ignored or deleted. This may be to allow the second cleaner 100b to move to the current position of the first cleaner 100a as a target trajectory.

The second cleaner 100b may follow the trajectory of the first cleaner 100a one by one from a time point when the length of the trajectory to be followed by the second cleaner 100b is equal to or greater than the minimum separation distance (D1).

When the second cleaner 100b moves while following the trajectory, the first cleaner 100a may also continue to move while performing cleaning, resulting in an additional trajectory. Therefore, the length of the trajectory to be followed by the second cleaner 100b may continuously vary.

The follow-up of the trajectory of the second cleaner 100b may be continuously carried out until the length of the trajectory to follow satisfies the minimum separation distance (D1) but does not exceed the maximum separation distance (D2).

A case where the length of the trajectory to be followed by the second cleaner 100b deviates from a predetermined follow-up distance range (D4) may largely be a case where it decreases to be less than the determined follow-up distance range (D4) or a case where it increases to exceed the predetermined follow-up distance range (D4).

The controller of the first cleaner 100a may continuously monitor whether the length of the trajectory to be followed by the second cleaner 100b deviates from the predetermined follow-up distance range (D4). Furthermore, when the length of the trajectory to be followed by the second cleaner 100b deviates from the predetermined follow-up distance range (D4), the moving of the first cleaner 100a and/or the second cleaner 100b may be controlled to satisfy the predetermined follow-up distance range (D4).

In one embodiment, when the length of the trajectory to be followed by the second cleaner 100b is less than the following follow-up distance range (D4), for example, when satisfied to be within the first separation distance range (D1) in FIG. 7A, the controller of the first cleaner 100a may transmit a control command for reducing the speed of the second cleaner 100b or transmit a stop command.

Accordingly, the first cleaner 100a may control the length of the trajectory to be followed by the second cleaner 100b to be maintained again within the predetermined follow-up distance range (D4).

In addition, when the length of the trajectory to be followed by the second cleaner 100b increases to exceed the predetermined follow-up distance range (D2), for example, when the second separation distance range (D2) is satisfied in FIG. 7A, the controller of the first cleaner 100a may control the first cleaner 100a to move at a reduced speed such that the length of the trajectory to be followed by the second cleaner 100b is maintained again within the predetermined follow-up distance range (D4).

Meanwhile, when the length of the trajectory to be followed by the second cleaner 100b is further increased to reach a critical stop distance (D3) in spite of the decelerated moving of the first cleaner 100a, the controller of the first cleaner 100a may stop the moving of the first cleaner 100a.

The second cleaner 100b may move while following the positions of the trajectory of the first cleaner 100a one by one using the current position of the first cleaner 100a as a target. Alternatively, the second cleaner 100b may directly move from its own position to the current position of the first cleaner 100a.

Figure 7B:
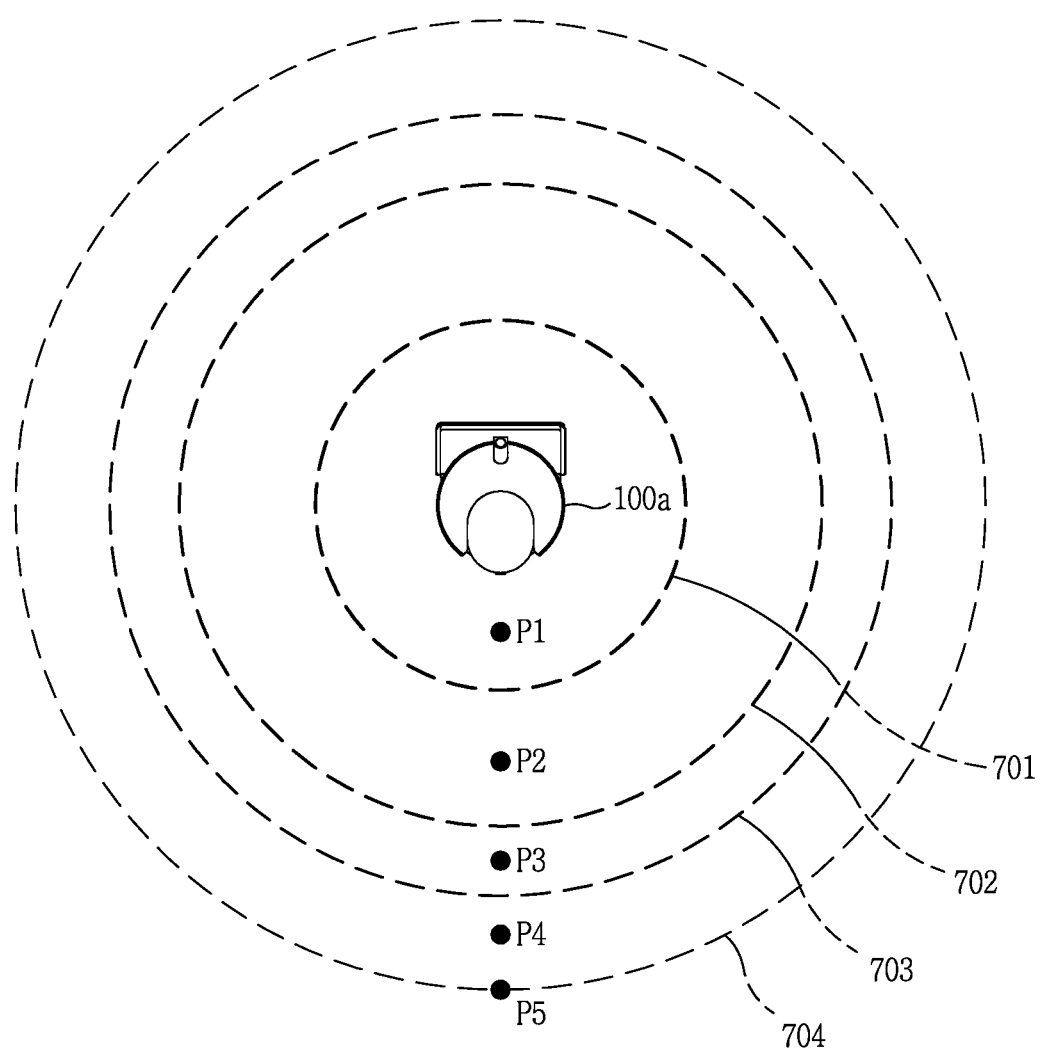
FIG. 7B is another view illustrating follow-up control of a second cleaner based on a distance of the movement trajectory of a first cleaner in a plurality of mobile robots according to an embodiment of the present disclosure.

FIG. 7B shows a case where a separation distance between the first cleaner 100a and the second cleaner 100b is equal to the length of the trajectory to be followed by the second cleaner 100b. For example, a case where the first cleaner 100a and the second cleaner 100b move in the same direction within a range capable of determining relative positions between them will be described.

In this case, the controller of the first cleaner 100a may control the moving of the first cleaner 100a and/or the second cleaner 100b such that a separation distance between the first cleaner 100a and the second cleaner 100b may be maintained within a predetermined follow-up distance range.

Alternatively, the controller of the second cleaner 100b may sense a trajectory corresponding to the movement of the first cleaner 100a, and then control moving to sequentially follow the positions of the movement trajectory of the first cleaner 100a sensed according to a control signal of the first cleaner 100a.

Here, the controller of the second cleaner 100b may control the moving of the first cleaner 100a and/or the second cleaner 100b such that a separation distance between the first cleaner 100a and the second cleaner 100b may be maintained within a predetermined follow-up distance range. For example, a control command for reducing the moving speed of the first cleaner 100a may be output or a control command for stopping the moving of the first cleaner 100a or the second cleaner 100b may be output.

The second cleaner 100b may be located at any one of different points (P1 to P5), and the second cleaner 100b may control follow-up moving with a target trajectory of the first cleaner 100a located at the center.

Each radius of a plurality of circles 701 to 704 shown in the drawing may be associated with the "determined follow-up distance range" described with reference to FIG. 7A. For example, the radius of a first circle 701 may be equal to or less than or below a predetermined follow-up distance range. The radius of a second circle 702 may be a range satisfying a predetermined follow-up distance range. The radius of a third circle 703 may be equal to or larger than or over a predetermined follow-up distance range, and the radius of a fourth circle 704 may correspond to a critical stop distance.

When the second cleaner 100b is positioned (P1) in the first circle 701, the controller of the first cleaner 100a may transmit a moving stop command to the second cleaner 100b. Alternatively, the controller of the second cleaner 100b may stop moving by itself, and transmit a signal corresponding thereto to the first cleaner 100a.

A trajectory corresponding to the movement of the first cleaner 100a may be stored in the first cleaner 100a or the second cleaner 100b while the second cleaner 100b is in a stationary state, and then followed one by one by the second cleaner 100b when a predetermined follow-up distance range is satisfied.

When the second cleaner 100b is positioned (P2) between the first circle 701 and the second circle 702 or positioned (P3) between the second circle 702 and the third circle 703, it may be satisfied within a predetermined follow-up distance range, and thus the second cleaner 100b may be controlled to follow the trajectory of the first cleaner 100a one by one. At this time, the second cleaner 100b may first follow the position of the trajectory closest to the current position of the second cleaner 100b among the positions of the trajectory existing within the predetermined follow-up distance range.

When the second cleaner 100b is positioned (P4) between the third circle 703 and the fourth circle 704, the controller of the first cleaner 100a may control the first cleaner 100a to move at a reduced speed. Furthermore, when the second cleaner 100b is positioned at a radius of the fourth circle 704 or exceeds the radius of the fourth circle 704, the controller of the first cleaner 100a may stop the moving of the first cleaner 100a, thereby performing uninterrupted follow-up.

As described above, according to the present disclosure, within a range capable of determining relative positions between the first cleaner 100a and the second cleaner 100b, the second cleaner 100b may follow the trajectory of the first cleaner 100a while a distance of the trajectory to be followed by the second cleaner 100b maintains a predetermined range of follow-up distance.

Furthermore, when a distance of the trajectory to be followed by the second cleaner 100b deviates from the predetermined range, the first cleaner 100a and/or the second cleaner 100b may vary the movement speeds of the first cleaner 100a and/or the second cleaner 100b (including a stop command), thereby satisfying stability in both the control and visual aspects of follow-up.

Hereinafter, the operation process of a control method of the mobile robot for performing follow-up control based on a distance of trajectory to follow other than a separation distance will be described in detail with reference to FIG. 8.

Here, the first cleaner 100a is used to mean an "another mobile robot," a "head cleaner," or a "leading moving robot." In addition, the second cleaner 100b is used to mean a "main body, a "following cleaner," a "following mobile robot." Furthermore, a plurality of cleaners 100a, 100b have the same meaning as a plurality of mobile robots or a plurality of robots.

Figure 8:
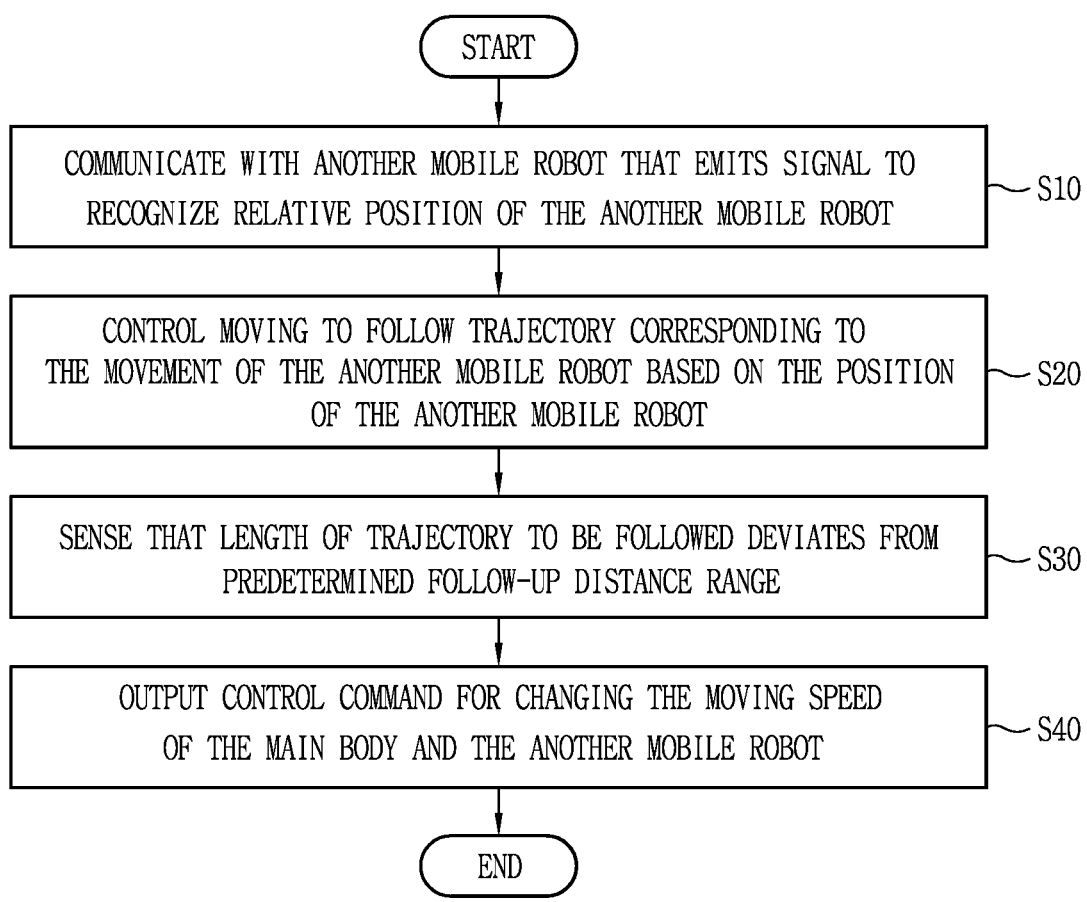
FIG. 8 is a representative flowchart for explaining a method of controlling a mobile robot according to an embodiment of the present disclosure.

In FIG. 8, the first cleaner 100a may perform UWB communication with another cleaner 100b, that is, the second cleaner 100b which emits a signal (e.g., UWB signal), to recognize a relative position of the second cleaner 100b. In addition, the second cleaner 100b may communicate with the first cleaner 100a which emits a signal (UWB signal) to recognize a relative position of the first cleaner 100a (S10).

For this purpose, the first cleaner 100a and the second cleaner 100b may transmit and receive signals to and from each other through an IR sensor, an ultrasonic sensor, a UWB sensor, or the like, disposed on a side outer circumferential surface of each cleaner or embedded in the main body to determine a direction and distance between each other.

For example, the first cleaner 100a may emit a first signal through the foregoing sensor and receive a second signal received from the second cleaner 100b, thereby recognizing a relative position of the second cleaner 100b.

Furthermore, for example, the second cleaner 100b may receive a first signal received from the first cleaner 100a through the foregoing sensor, thereby recognizing a relative position of the first cleaner 100a.

It may be said that the first cleaner 100a operates as a "UWB anchor" for transmitting a UWB signal as first signal and the second cleaner 100b operates as a "UWB tag" for receiving a UWB signal of the first cleaner 100a, based on the second cleaner 100b.

Each of the plurality of cleaners 100a, 100b may be provided with one UWB sensor, or the first cleaner 100a may be provided with a single UWB sensor, and the second cleaner 100b following the first cleaner 100a may be provided with at least two UWB sensors or a single UWB sensor and a plurality of antennas, so that at least the first cleaner 100a can calculate distances to the second cleaner 100b from the first cleaner 100a through an optical signal received at two different time points (t1, t2).

Alternatively, relative positions to each other may be determined based on the positions of antennas and the angles of the signal receiving directions provided in the plurality of cleaners 100a, 100b, respectively. To this end, each of the plurality of cleaners 100a, 100b may be provided with one or more receiving antennas.

For example, the first cleaner 100a may include one or more antennas electrically connected to a single UWB sensor (or UWB tag). Here, the position of the antenna may be a back or rear side of the main body of the first cleaner 100a in consideration of the second cleaner 100b that emits a signal while following the first cleaner 100a from the rear side. However, the present disclosure is not limited thereto.

Furthermore, the second cleaner 100b may include a plurality of antennas electrically connected to a single UWB sensor (or UWB tag). Here, the positions of the plurality of antennas may be spaced apart from each other on a front/rear side, or may be spaced apart from each other on front and rear sides, respectively.

Here, the front and rear sides may be based on a moving direction of the main body of the second cleaner 100b, and the front side may be located on a front side with respect to the moving direction of the main body of the second cleaner 100b, and the rear side may be located on a rear side with respect to the moving direction of the main body of the second cleaner 100b.

Furthermore, a plurality of antennas provided in the second cleaner 100b may be spaced apart from each other as described above, thereby determining whether the second cleaner 100b is located on a rear side of the first cleaner 100a or located on a front side thereof in a reversed manner, based on the direction and intensity of a signal received from the first cleaner 100a.

In addition, it may be possible to determine whether the second cleaner 100b is located on a rear side of the first cleaner 100b or located on a front side thereof in a reversed manner, based on the direction and intensity of a signal received from the second cleaner 100b through an antenna provided in the first cleaner 100a.

Besides, the antenna or the plurality of antennas may be formed to transmit and receive various signals, and for an example, may be formed to transmit and receive a UWB (Ultra-Wide Band) signal when provided together with a UWB sensor.

As described above, according to the present disclosure, since the plurality of cleaners 100a, 100b may determine relative positions to each other, follow-up control may be carried out without any interruption by determining the relative positions to each other irrespective of the communication state of the server. In addition, it may be easy to see whether the second cleaner 100b is following from the rear side of the first cleaner 100a or located in front of the first cleaner 100a based on the direction and intensity of the received signal.

Next, the second cleaner 100b may control the moving of the second cleaner 100b to follow a trajectory corresponding to the movement of the first cleaner 100a, within a predetermined follow-up distance range, based on the relative position of the first cleaner 100a (S20). This assumes that the second cleaner 100b may sense a change in the movement trajectory of the first cleaner 100a. In this case, the first cleaner 100a may not need to transmit information corresponding to its own movement trajectory to the second cleaner 100b.

Alternatively, the first cleaner 100a may control the moving of the second cleaner 100b such that the second cleaner 100b follows a trajectory corresponding to the movement of the first cleaner 100a, within a predetermined follow-up distance range, based on the relative position of the second cleaner 100b.

This assumes that the first cleaner 100a may transmit information corresponding to its own movement trajectory to the second cleaner 100b. In this case, the first cleaner 100a, which is the head cleaner, may control its own moving and the moving start, moving speed, and moving stop of the second cleaner 100b.

The controller of the first cleaner 100a may determine the length of a trajectory to be followed by the second cleaner 100b based on the positions of a trajectory corresponding to the movement of the first cleaner 100a and a relative position of the second cleaner 100b. At this time, the determined length of the trajectory may be at least equal to or greater than a separation distance between the first cleaner 100a and the second cleaner 100b.

Furthermore, in another example, the second cleaner 100b may sense the positions of a trajectory corresponding to the movement of the first cleaner 100a through sensors provided at a front side of the main body, for example, a UWB sensor and an antenna, and then sequentially move the sensed positions of the trajectory in response to a length of the trajectory satisfying a predetermined follow-up distance range.

Here, within the predetermined follow-up distance range may denote between values satisfying a predetermined minimum separation distance and more as well as satisfying a predetermined maximum separation distance or less. Therefore, within the predetermined follow-up distance range may be excluded when a value is less than the predetermined follow-up distance range or exceeds the predetermined follow-up distance range.

At this time, the minimum separation distance may be determined in consideration of a case where the first cleaner 100a stops moving or changes its moving direction, and may be a separation distance (e.g., 30 to 35 cm) as the width of one cleaner.

In addition, the maximum separation distance may be determined in consideration of an accuracy of obtaining a relative position between the first cleaner 100a and the second cleaner 100b and a case where the first cleaner 100a moves in a reverse direction, and for example, may be determined as a separation distance (e.g., 60 to 70 cm) as the width of two cleaners.

In addition, a trajectory corresponding to the movement may denote arbitrary positions (or points) existing on a moving path actually moved by the first cleaner 100a, which is the head cleaner, during cleaning.

Furthermore, since the moving path of the first cleaner 100a may include a plurality of trajectories, the follow-up of a trajectory corresponding to the movement may refer to following positions (or points) on a moving path actually moved by the first cleaner 100a during cleaning.

To this end, the controller of the first cleaner 100a or the controller of the second cleaner 100b may recognize all coordinates corresponding to the position of the first cleaner 100a, the positions of a trajectory passed by the first cleaner 100a, and the relative position of the second cleaner 100b. To this end, the first and second cleaners 100a, 100b may transmit and receive signals to and from each other through a sensor (e.g., a UWB sensor, an IR sensor, etc.) provided in the first and second cleaners 100a 100b, respectively, to recognize coordinates corresponding to relative positions to each other.

Specifically, with respect to the first cleaner 100a, for example, the first cleaner 100a and the second cleaner 100b may initiate follow-up control from a specific point area, and thus the controller of the first cleaner 100a may determine the initial coordinates of the first cleaner 100a and the second cleaner 100b at the same time.

Furthermore, the controller of the first cleaner 100a may recognize a first coordinate corresponding to a change of trajectory corresponding to the movement of the first cleaner 100a at the initial coordinates. The controller of the first cleaner 100a may continuously obtain a second coordinate corresponding to the relative position of the second cleaner 100b spaced from the first coordinate information.

When the coordinate of a trajectory is determined based on the second cleaner 100b, the controller of the second cleaner 100b may track a trajectory corresponding to the movement of the first cleaner 100a to match the coordinate system of the initial coordinates and the coordinate system of a first coordinate corresponding to a change of trajectory corresponding to the movement of the first cleaner 100a, thereby recognizing a coordinate corresponding to the trajectory of the first cleaner 100a with respect to the second cleaner 100b.

Subsequently, the controller of the first cleaner 100a may recognize a third coordinate corresponding to an additional trajectory according to the movement of the first cleaner 100a. Since the second cleaner 100b follows a trajectory corresponding to the movement of the first cleaner 100a, the second cleaner 100b must sequentially move the first coordinate and the third coordinate from the second coordinate corresponding to a current position. Therefore, the length of trajectory to be followed by the second cleaner 100b may be said to be a length of line connecting the second coordinate, the first coordinate, and the third coordinate.

A method of matching the coordinates of the first cleaner 100a and the second cleaner 100b may be similar to that described above in order to recognize all coordinates corresponding to the position of the second cleaner 100b, the positions of a trajectory passed by the first cleaner 100a, and the relative position of the first cleaner 100a, on the basis of the second cleaner 100b.

Meanwhile, the main body, that is, the second cleaner 100b, may sense that the length of a trajectory to be followed by the second cleaner 100b deviates from the predetermined follow-up distance range (S30).

To this end, the controller of the second cleaner 100b may sequentially store the position information of a trajectory of the first cleaner 100a sensed in a sensing area formed through sensors provided at a front side of the second cleaner 100b, for example, a UWB sensor and an antenna, in a predetermined distance unit, and when the stored position information of the trajectory exceeds a predetermined number, it may be determined to be out of a predetermined follow-up distance range. In addition, the second cleaner 100b may transmit a signal indicating that the length of a trajectory to be followed by the second cleaner 100b deviates from a predetermined follow-up distance range through the communication unit.

Here, the sensors provided at a front side of the second cleaner 100b may be replaced with a sensor and an antenna using any one of other wireless communication technologies such as Zigbee, Z-wave, Bluetooth, or the like, other than the UWB sensor and the antenna that transmits and receives UWB signals.

Furthermore, the controller of the first cleaner 100a may obtain a distance of trajectory to be followed by the second cleaner 100b from the current position based on a second coordinate corresponding to the position of the second cleaner 100b, a first coordinate corresponding to the position of a trajectory passed by the first cleaner 100a, and a third coordinate corresponding to the current position of the first cleaner 100a.

At this time, the length of trajectory to be followed by the second cleaner 100b may be continuously varied with respect to a positional change of the first cleaner 100a and the second cleaner 100b.

Furthermore, there may exist a plurality of coordinates corresponding to the positions of a trajectory passed by the first cleaner 100a, and these coordinates may be transmitted from the first cleaner 100a to the second cleaner 100b, and sequentially stored in the memory of the second cleaner 100b. In this case, the coordinates stored in the second cleaner 100b are followed in the stored time order.

Following the stored coordinates to move to the corresponding positions by the second cleaner 100b may be said as "clearing" the coordinates. Here, it may also be said that the coordinates are cleared when the center of the second cleaner 100b is present within an outer circumferential surface of the second cleaner 100b or close to the outer circumferential surface thereof without reaching the coordinates exactly.

The cleared coordinates as described above may be deleted from the memory of the second cleaner 100b. At the same time, coordinates corresponding to the positions of a new trajectory of the first cleaner 100a may be transmitted to the second cleaner 100b, and stored in the second cleaner 100b.

In case where the coordinates corresponding to the positions of a trajectory passed by the first cleaner 100a are stored by a predetermined distance unit (e.g., 10 cm), it may be said that as the number of coordinates stored in the first cleaner 100a increases, a distance of trajectory to be followed by the second cleaner 100b increases proportionally. Furthermore, it may also be said that as the number of coordinates stored in the first cleaner 100a decreases, the distance of trajectory to be followed by the second cleaner 100b decreases proportionally.

In another example, it may be sensed by the other mobile robot, that is, the first cleaner 100a, that the length of trajectory to be followed by the second cleaner 100b deviates from the predetermined follow-up distance range.

To this end, the controller of the first cleaner 100a may calculate a distance of trajectory to be followed by the second cleaner 100b based on the relative position of the second cleaner 100b, and may monitor whether the calculated distance of trajectory deviates from the predetermined follow-up distance range. When it is sensed that the length of trajectory to be followed by the second cleaner 100b deviates from the follow-up distance range, the controller of the first cleaner 100a may transmit a signal corresponding thereto to the second cleaner 100b to allow the second cleaner 100b to recognize it.

When it is sensed that the length of trajectory to be followed by the second cleaner 100b deviates from the predetermined follow-up distance range, the controller of the second cleaner 100b may output a control command for changing the movement speed of the second cleaner 100b or the first cleaner 100a (S40).

Here, the control command for changing the movement speed may include acceleration, deceleration commands of the movement speed, and a movement stop command, that is, a case where the movement speed is "0".

Specifically, when the length of trajectory to be followed by the second cleaner 100b increases beyond the predetermined range, the controller of the second cleaner 100b may output a control command for reducing or stopping the movement speed of the first cleaner 100a. In other words, the moving speed of the head cleaner may be reduced or the moving thereof may be stopped.

Furthermore, when it is sensed that the length of trajectory to be followed by the second cleaner 100b exceeds the predetermined range to reach a critical stop distance, the controller of the second cleaner 100b may output a control command for stopping the moving of the first cleaner 100a.

Here, the critical stop distance may be a case where the length of trajectory to be followed by the second cleaner 100b at the time of follow-up between the first cleaner 100a and the second cleaner 100b is the maximum value, for example, about 90 cm.

In one example, when the length of trajectory to be followed by the second cleaner 100b exceeds the critical stop distance (for example, the length of trajectory to be followed by the second cleaner 100b is 1 m or more), the controller of the controller 100a may sense that the second cleaner is in a follow-up disable state to cancel follow-up. In this case, a trajectory corresponding to the movement of the first cleaner 100a may be reset, and follow-up may be resumed after the first cleaner 100a moves to the current position of the second cleaner 100b.

On the other hand, in one example, the first cleaner 100a may be controlled to decrease the movement speed by itself when the length of trajectory to be followed by the second cleaner 100b increases beyond the predetermined range, and to stop moving by itself when reaching a critical stop distance.

When the length of trajectory to be followed by the second cleaner 100b decreases below the predetermined range, the second cleaner 100b may output a control command for stopping its own moving.

In this case, the second cleaner 100b may follow the position of the trajectory closest to the current position of the second cleaner 100b after a predetermined period of time has elapsed. To this end, the second cleaner 100b may track a trajectory according to the movement of the first cleaner 100a for a predetermined period of time, and may store coordinates corresponding to the positions of the trajectory corresponding thereto in the memory in a time order.

Hereinafter, examples associated with a time point at which the second cleaner 100b follows a trajectory corresponding to the movement of the first cleaner 100a will be described in detail with reference to FIGS. 9A and 9B.

Figure 9A:
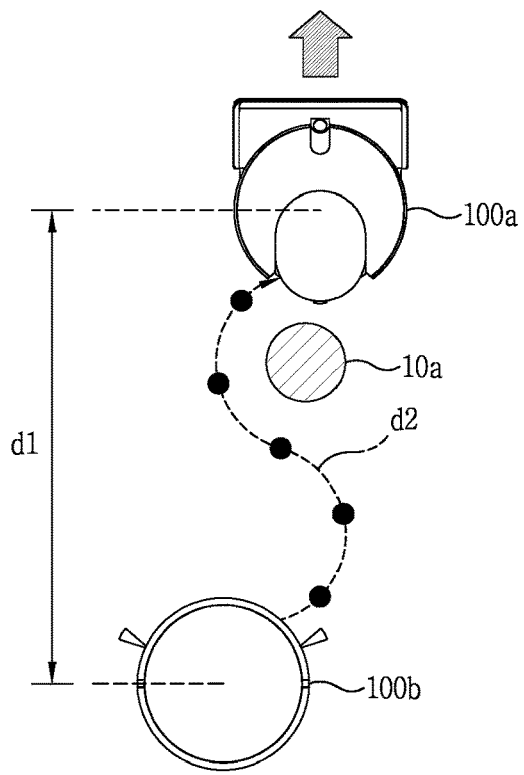
FIG. 9A is a view illustrating examples associated with a time point when a second cleaner moves while following a trajectory corresponding to the movement of a first cleaner according to an embodiment of the present disclosure.

FIG. 9A shows a case where the length of trajectory to be followed by the second cleaner 100b is larger than a separation distance between the first cleaner 100a and the second cleaner 100b as the first cleaner 100a moves while avoiding a specific region 10a based on the sensing signal.

Specifically, the sensing signal may be one of a signal corresponding to a moving mode of the first cleaner 100a based on map information, reception of a signal by an external signal sensor, an obstacle sensing signal by a front sensing sensor/3D sensor/camera sensor/collision sensor, and a signal corresponding to a topographic feature of the floor sensed by a cliff sensor/geomagnetic sensor, and a sensing signal of a region set to a virtual region (e.g., virtual wall, etc.), and a sensing signal of a trap learned by Deep Learning (DL)/Deep Neural Networks (DNN).

In addition, there may exist any one of obstacles (including all fixed and moving obstacles), a carpet, a cliff, a virtual region, and a trap for inducing the generation of the sensing signal in the specific region 10a.

In this case, even when an actual separation distance (d1) between the first cleaner 100a and the second cleaner 100b is less than the predetermined range, and a length (d2) of a curve to be followed by the second cleaner 100b satisfies the predetermined range, the second cleaner 100b may be controlled to follow the trajectory (black dots shown) of the first cleaner 100a one by one from that time point.

Specifically, the second cleaner 100b may store the information of a trajectory received from the first cleaner 100a or information corresponding to the positions of a trajectory sensed by the second cleaner 100b until the length (d2) of a curve to be followed by the second cleaner 100b satisfies the predetermined range.

At this time, the received information of the trajectory or the information corresponding to the sensed positions of the trajectory may be stored in the memory of the second cleaner 100b in a predetermined distance unit, for example, by a 10 cm unit.

At this time, the information of the trajectory may be stored in the memory of the second cleaner 100b in the form of a one-dimensional array having the (x, y) coordinate as an element. The stored information of the trajectory, that is, a specific coordinate, may be deleted after the second cleaner 100b moves to the position of the relevant coordinate.

When the information of the trajectory is stored by a predetermined distance unit (for example, 10 cm), a distance of trajectory to be followed by the second cleaner 100b may be determined based on the number of (x, y) coordinates remaining in the memory of the second cleaner 100b.

For example, from a time point when the number of (x, y) coordinates stored in the memory reaches the maximum critical number, for example, six, the second cleaner 100b may be controlled to follow the positions of the coordinates in the first stored order. In addition, the second cleaner 100b may stop the moving of the second cleaner 100b at a time point when the number of (x, y) coordinates stored in the memory reaches the minimum critical number, for example, three.

In FIG. 9A, when the length (d2) of a curve to be followed by the second cleaner 100b satisfies the predetermined range, the second cleaner 100b may move to follow the positions corresponding to the stored information of the trajectory one by one in order.

At this time, the information of the trajectory corresponding to the cleared coordinates in accordance with the movement of the second cleaner 100b may be deleted from the memory of the second cleaner 100b. Then, the information of an additional trajectory corresponding to the movement of the first cleaner 100a may be continuously stored in the memory of the second cleaner 100b.

Figure 9B:
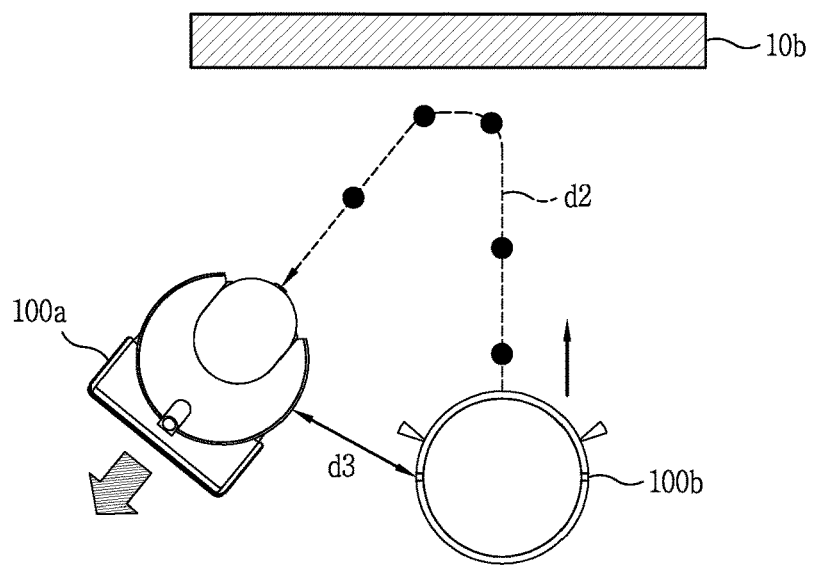
FIG. 9B is another view illustrating examples associated with a time point when a second cleaner moves while following a trajectory corresponding to the movement of a first cleaner according to an embodiment of the present disclosure.

FIG. 9B shows a case where a length of trajectory to be followed by the second cleaner 100b increases, and a separation distance between the first cleaner 100a and the second cleaner 100b decreases as the moving direction of the first cleaner 100a faces the position of the second cleaner 100b.

For example, when the first cleaner 100a senses an obstacle 10b such as a wall existing in front, and moves in a reverse direction in which the second cleaner 100b on the rear side is located or in a proximity direction, a separation distance (d3) between the first cleaner 100a and the second cleaner 100b may be gradually reduced. Even at this time, when the length (d2) of trajectory to be followed by the second cleaner 100b satisfies the foregoing predetermined range, the second cleaner 100b may follow the trajectory (black points shown) of the first cleaner 100a one by one.

On the other hand, in FIG. 9B, while the second cleaner 100b follows the trajectory of the first cleaner 100a, the first cleaner 100a may exceptionally stop moving until the second cleaner 100b changes its moving direction to avoid an obstacle 10b not to miss an additional trajectory due to the movement of the first cleaner 100a.

Alternatively, in FIG. 9B, the second cleaner 100b may operate to exceptionally track a trajectory corresponding to the movement of the first cleaner 100a in place until the first cleaner 100a approaches a critical stop distance, and to follow the trajectory of the first cleaner 100a one by one after the first cleaner 100a stops moving.

Figure 9C:
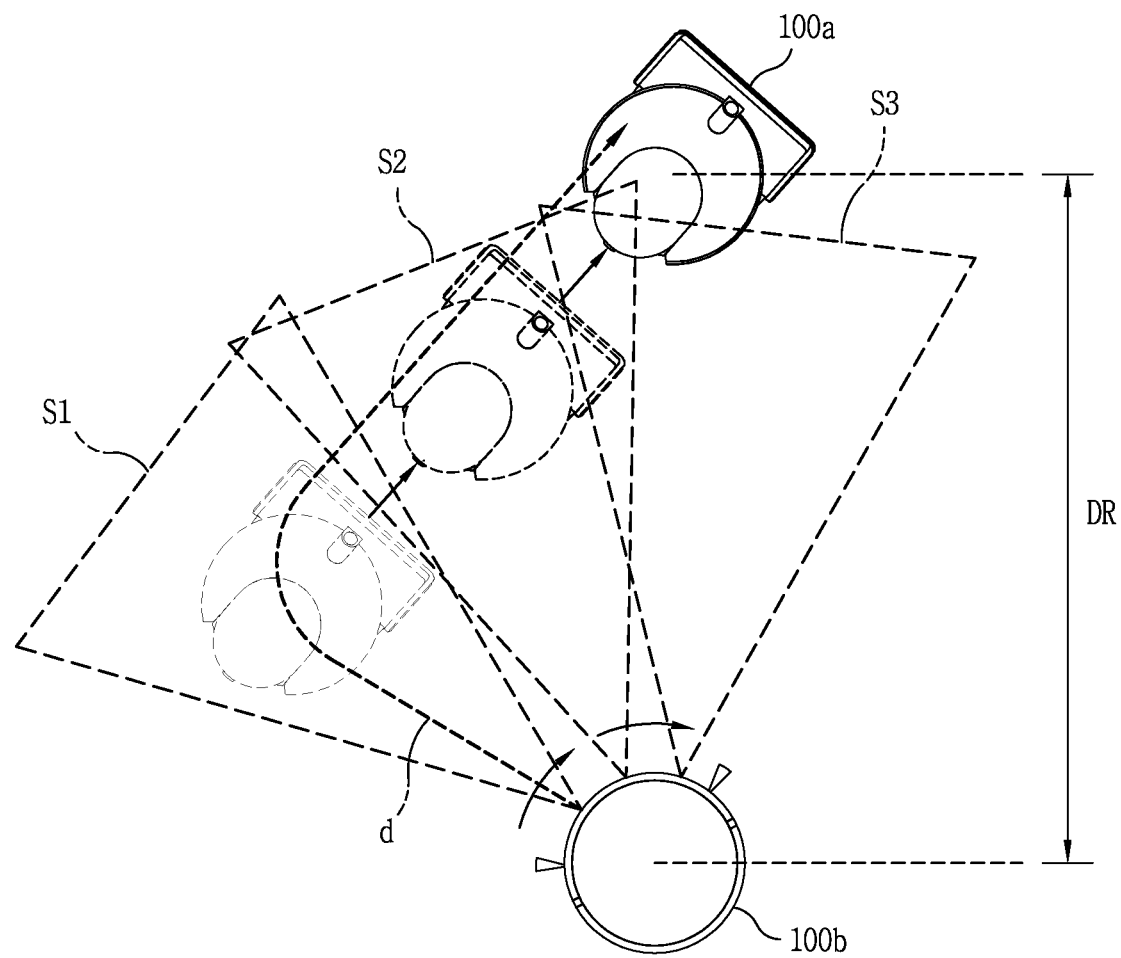
FIG. 9C is a view illustrating an exemplary operation of another cleaner that performs a motion following a trajectory corresponding to movement of a mobile robot according to an embodiment of the present disclosure.

FIG. 9C shows an example in which the second cleaner 100b performs searching motion that allows the second cleaner 100b to follow the trajectory of the first cleaner 100a in place while the distance of a trajectory corresponding to the movement of the first cleaner 100a is less than a predetermined range.

As described above with reference to FIGS. 7A and 7B, while the distance of trajectory to be followed by the second cleaner 100b is less than the predetermined range (D4, FIG. 7A), the second cleaner 100b may maintain in a stationary and standby state. Here, the standby state may denote a state in which the second cleaner 100b does not move to the position of the trajectory until the distance of a trajectory corresponding to the movement of the first cleaner 100a satisfies a predetermined range.

In an embodiment according to the present disclosure, the second cleaner 100b may perform searching motion for tracking the direction of a trajectory moved by the first cleaner 100a in place while the second cleaner 100b is in the standby state.

Here, the searching motion may refer to an operation in which the second cleaner 100b rotates in a predetermined direction and at a predetermined speed toward the first cleaner 100a in place without being moved.

Here, it may be said that the predetermined direction corresponds to the moving direction of the first cleaner 100a with respect to the front side of the second cleaner 100b. Furthermore, it may be said that the predetermined speed corresponds to the moving direction of the first cleaner 100a with respect to the front side of the second cleaner 100b.

In addition, a predetermined "sensing area" may be formed in front of the second cleaner 100b by the operation of a sensor and an antenna provided to sense the first cleaner 100a. It may be said that the second cleaner 100b performs searching motion such that the first cleaner 100a is located within the sensing area.

Referring to FIG. 9C, the second cleaner 100b performs rotation for changing the front side to correspond to the moving direction and the moving speed corresponding to the movement path (d) of the first cleaner 100a at a current position while the distance of trajectory to be followed by the second cleaner 100b is less than the predetermined value and thus in a standby state. Accordingly, the positions of the predetermined sensing area may also change in the order of S1, S2 and S3. The second cleaner 100b may sequentially track the positions of a trajectory corresponding to the movement path (d) of the first cleaner 100a in place.

At this time, the information of the trajectory corresponding to the movement path (d) of the first cleaner 100a may be stored in order in the memory of the second cleaner 100b as described above.

Then, when it is sensed that a distance (DR) between the first cleaner 100a and the second cleaner 100b increases and a distance of trajectory to be followed by the second cleaner 100b increases within a predetermined range, the second cleaner 100b may move straight to follow the positions of a trajectory close to the current position, for example, the positions of a trajectory within the sensing area (S1) close to the current position of the second cleaner 100b. Furthermore, it may be controlled to follow the next trajectory on the movement path (d2) of the first cleaner 100a in order.

Hereinafter, various operations corresponding to a change in the length of trajectory to be followed by the second cleaner as the follower cleaner in accordance with the movement of the first cleaner as the head cleaner will be described with reference to FIG. 10 and FIGS. 11A through 11I.

Figure 10:
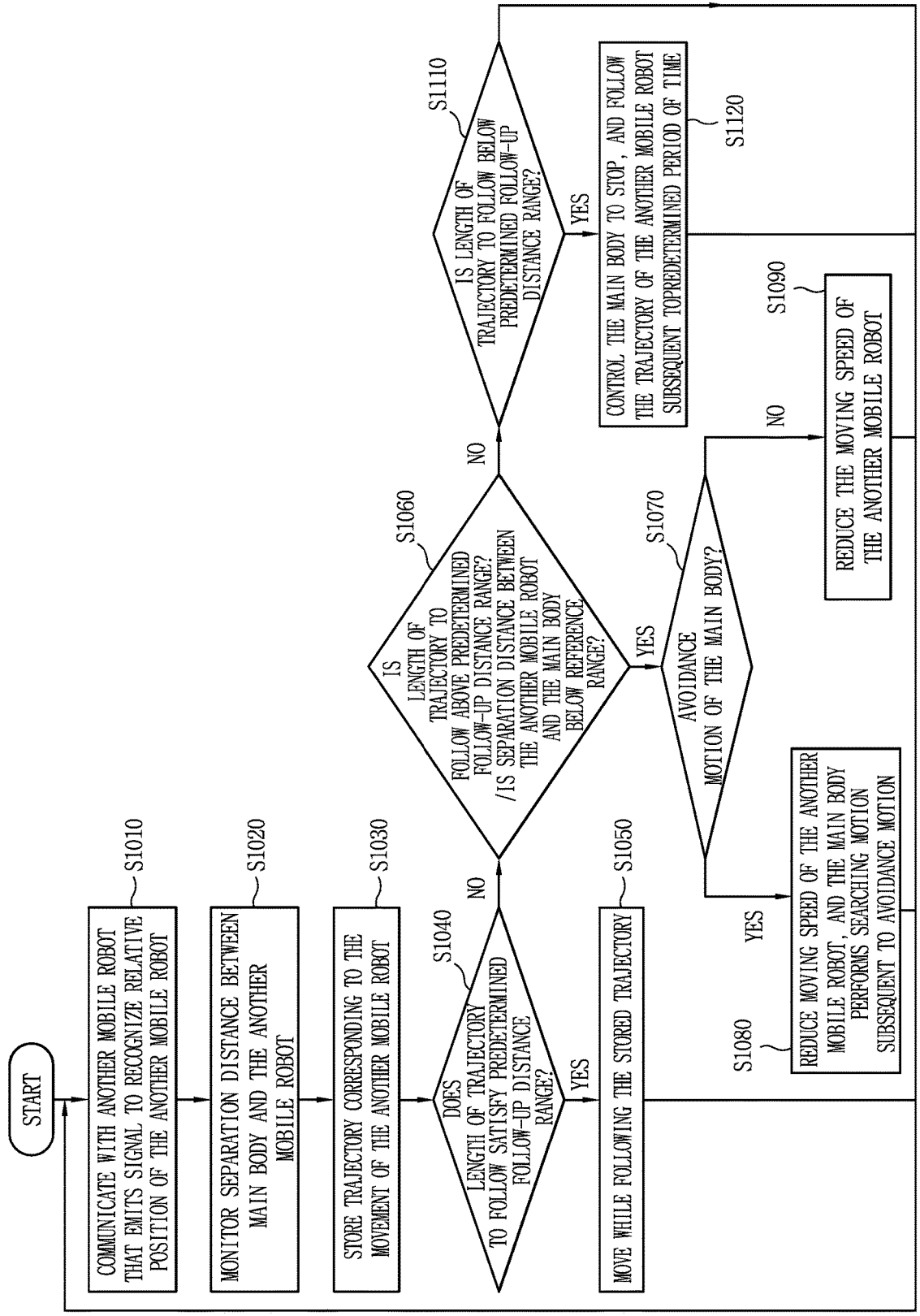
FIG. 10 is an exemplary flowchart for explaining the operations of first and second cleaners corresponding to a length change of trajectory to be followed by the second cleaner in a plurality of mobile robots according to an embodiment of the present disclosure.

In a flowchart in FIG. 10, when the follow-up of a plurality of robot cleaners is started, the first cleaner 100a may communicate with the second cleaner 100b that emits a signal to recognize the relative position of the second cleaner 100b. Furthermore, the second cleaner 100b may communicate with the first cleaner 100a that emits a signal to recognize the relative position of the first cleaner 100a. In other words, the first cleaner 100a and the second cleaner 100b may recognize relative positions to each other (S1010).

When the follow-up cleaning of the first cleaner 100a and the second cleaner 100b is started from a predetermined point or the same point, the x, y coordinate information of the predetermined point or the same point may be obtained. Then, the positional coordinate of the first cleaner 100a may be calculated according to the movement of the first cleaner 100a, and the relative position of the second cleaner 100b may be recognized based on the positional coordinate of the first cleaner 100a, and thus the positional coordinate of the second cleaner 100b may also be calculated.

Subsequent to the start of the follow-up cleaning, the second cleaner 100b may monitor a separation distance between the first cleaner 100a and the second cleaner 100b (S1020). This may be carried out by continuously obtaining the positions of the first cleaner 100a and the second cleaner 100b by the second cleaner 100b.

A separation distance between the first cleaner 100a and the second cleaner 100b may have a concept different from the length of trajectory to be followed by the second cleaner 100b. The separation distance between the first cleaner 100a and the second cleaner 100b may denote a length of the shortest straight line from the position of the first cleaner 100a to the position of the second cleaner 100b. The length of trajectory to be followed by the second cleaner 100b may denote a length of path moved by the first cleaner 100a from the position of the second cleaner 100b to the position of the first cleaner 100a.

The second cleaner 100b may store the positions of a trajectory corresponding to the movement of the first cleaner 100a in a memory or the like, for example, in the form of a one-dimensional array (S1030).

For this purpose, the first cleaner 100a may transmit information including the positions of a trajectory of the first cleaner 100a to the second cleaner 100b at predetermined time intervals or at predetermined movement distances.

Alternatively, in another example, the second cleaner 100b may sense the relative positions of the first cleaner 100a at predetermined time intervals or at predetermined separation distances to store them one by one in its own memory.

When the positions of trajectory stored in the second cleaner 100b increases one by one, the length of trajectory to be followed by the second cleaner 100b may also increase. For example, assuming that the positions of the trajectory are stored whenever the first cleaner 100a moves by 10 cm, when the five positions of the trajectory are stored in the memory of the second cleaner 100b, the length of the trajectory to be followed by the second cleaner 100b may be 5*10 cm=50 cm.

Next, the second cleaner 100b may determine whether the length of a trajectory of the first cleaner 100a to be followed by the second cleaner 100b satisfies a predetermined follow-up distance range (S1040), and the second cleaner 100b may be controlled to move and follow the stored positions of the trajectory while the length of the trajectory to be followed by the second cleaner 100b maintains the predetermined follow-up distance range.

Figure 11A:
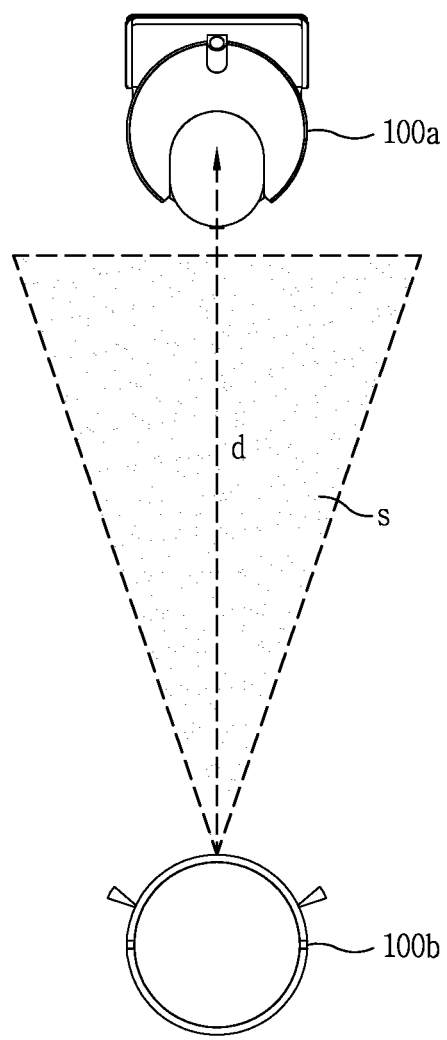
FIG. 11A is an exemplary conceptual view illustrating a moving operation based on a length of trajectory to be followed by a plurality of mobile robots according an embodiment of the present disclosure in association with FIG. 10.

For example, referring to FIG. 11A, the first cleaner 100a may move straight, and accordingly, the second cleaner 100b may move straight and follow the trajectory of the first cleaner 100a while the length (d) of trajectory to be followed by the second cleaner 100b satisfies a predetermined follow-up distance range.

Figure 11B:
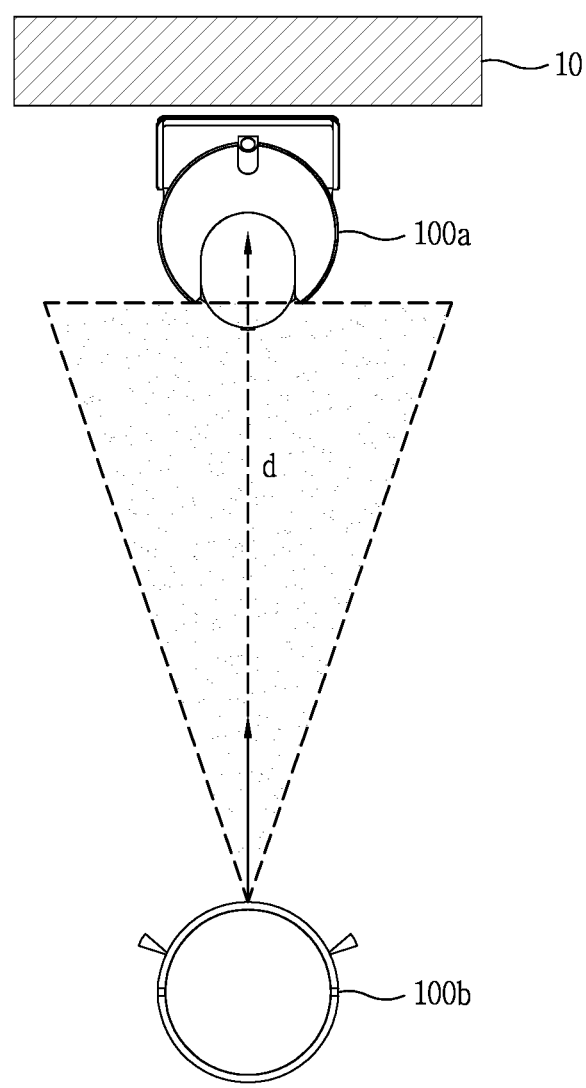
FIG. 11B is another exemplary conceptual view illustrating a moving operation based on a length of trajectory to be followed by a plurality of mobile robots according an embodiment of the present disclosure in association with FIG. 10.

Then, as illustrated in FIG. 11B, even while the first cleaner 100a faces an obstacle 10 such as a wall to perform moving stop and in-place rotation, the second cleaner 100b may continuously perform straight moving until the length of trajectory to follow decreases below a predetermined follow-up distance range. Accordingly, the first cleaner 100a may be sensed in the sensing area (S) formed by sensors, for example, a UWB sensor and an antenna, provided at a front side of the second cleaner 100b.

Figure 11C:
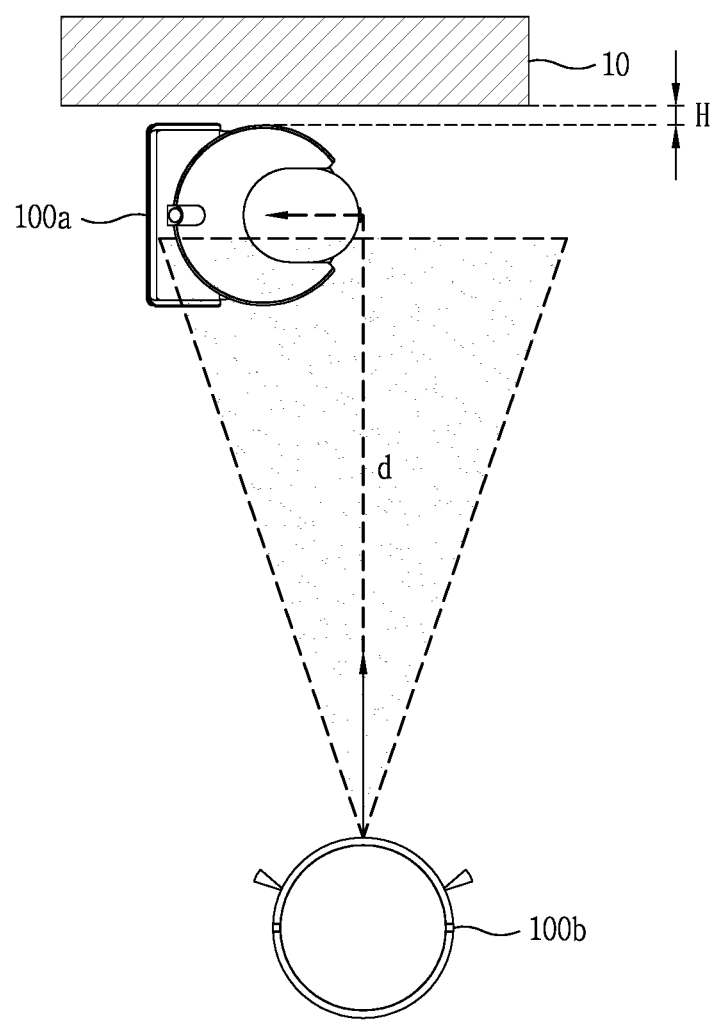
FIG. 11C is another exemplary conceptual view illustrating a moving operation based on a length of trajectory to be followed by a plurality of mobile robots according an embodiment of the present disclosure in association with FIG. 10.
Figure 11D:
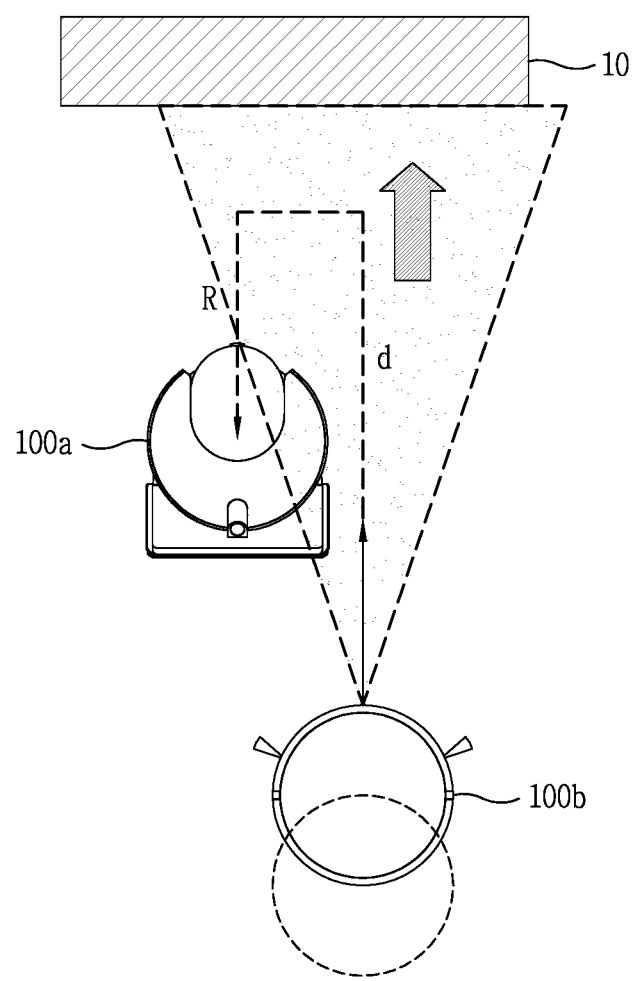
FIG. 11D is another exemplary conceptual view illustrating a moving operation based on a length of trajectory to be followed by a plurality of mobile robots according an embodiment of the present disclosure in association with FIG. 10.

In addition, even when the first cleaner 100a rotates 90 degrees to the left with respect to the front side while following the obstacle 10 at a predetermined distance (H) in FIG. 11C, and then continuously rotates 90 degrees to the left to move in a reverse direction (R) as shown in FIG. 11D, the second cleaner 100b may be controlled to continuously perform straight moving toward a trajectory passed by the first cleaner 100a, that is, the obstacle 10, while maintaining a predetermined follow-up distance range (e.g., while satisfying the distance (D1) or more as illustrated in FIG. 7A).

Referring to FIG. 10 again, a length of trajectory to be followed by the second cleaner 100b may increase over a predetermined follow-up distance range or a separation distance between the first cleaner 100a and the second cleaner 100b may decrease below a reference range in step S1050 in FIG. 10 (S1060).

In addition, in one example, even if the length of trajectory to be followed by the second cleaner 100b satisfies a predetermined follow-up distance range, when a separation distance between the first cleaner 100a and the second cleaner 100b decreases below the reference range, the process may directly go from step S1040 to step S1060.

Here, the reference range may be a criterion for determining whether the separation distance between the first cleaner 100a and the second cleaner 100b is close enough to disturb the moving, for example, within 10 to 15 cm. Accordingly, when the separation distance between the first cleaner 100a and the second cleaner 100b decreases below a reference range, control may be required not to allow that the first cleaner 100a and the second cleaner 100b to collide with each other.

For example, when the first cleaner 100a changes its moving direction and then continues to move in the changed moving direction, even though the length of trajectory to be followed by the second cleaner 100b increases, the separation distance between the first cleaner 100a and the second cleaner 100a may gradually decrease.

Subsequently, the separation distance between the first cleaner 100a and the second cleaner 100b may decrease below a reference range, and it may be determined whether the second cleaner 100b, which is a follower cleaner, performs avoidance moving (S1070).

When the second cleaner 100b performs avoidance moving, the movement speed of the first cleaner 100a may be reduced and the second cleaner 100b may be controlled to perform searching motion subsequent to the avoidance moving (S1080). At this time, even when the distance of trajectory to be followed by the second cleaner 100b satisfies a predetermined follow-up distance range, the operations corresponding to avoidance moving may be carried out first.

Figure 11E:
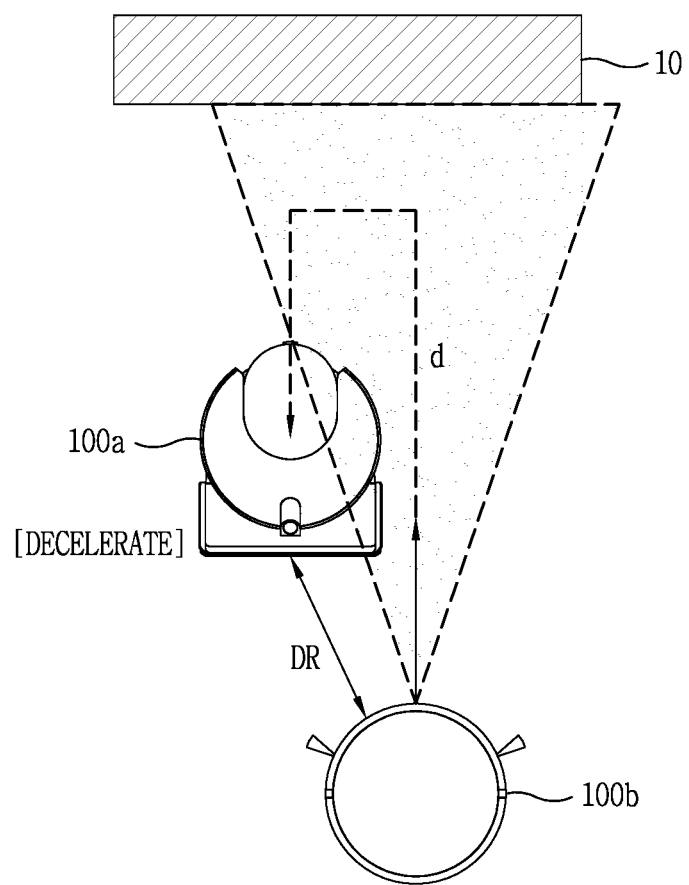
FIG. 11E is another exemplary conceptual view illustrating a moving operation based on a length of trajectory to be followed by a plurality of mobile robots according an embodiment of the present disclosure in association with FIG. 10.

Referring to FIG. 11E, when a separation distance (DR) between the first cleaner 100a and the second cleaner 100b is sensed to be less than a reference range as the first cleaner 100a moves in a reverse direction (R), the first cleaner 100a may move at a reduced speed so as not to collide with the second cleaner 100b.

Figure 11F:
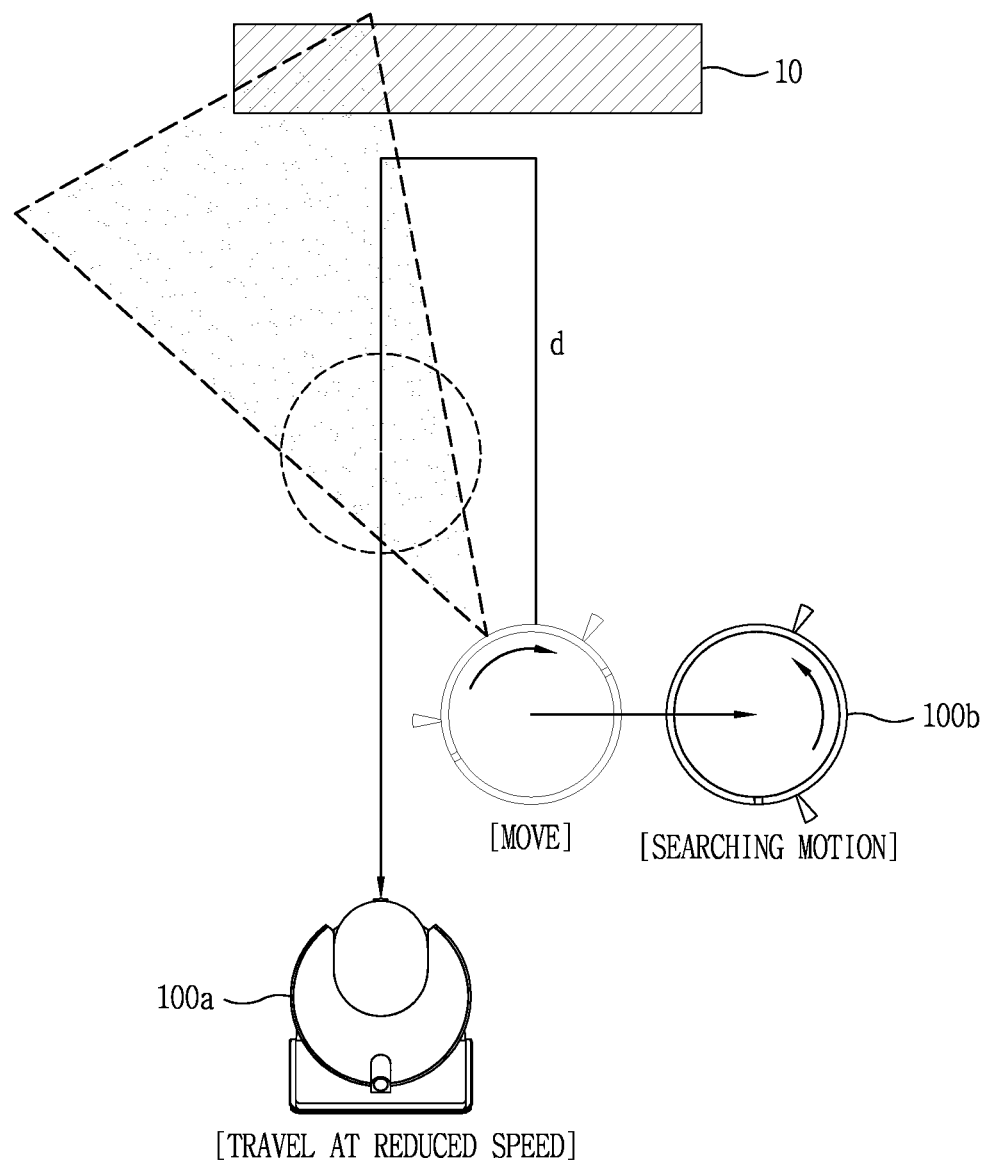
FIG. 11F is another exemplary conceptual view illustrating a moving operation based on a length of trajectory to be followed by a plurality of mobile robots according an embodiment of the present disclosure in association with FIG. 10.

While the first cleaner 100a moves at a reduced speed, the second cleaner 100b may perform searching motion subsequent to avoidance moving as illustrated in FIG. 11F. For example, the second cleaner 100b may move in a direction away from the first cleaner 100a, that is, in a rightward direction, and then performs a motion (searching motion) for rotating the main body of the second cleaner 100b along the moving path of the first cleaner 100a at the moved position.

In one example, a time point at which the searching motion is carried out may be a time point at which the first cleaner 100a starts to decelerate for avoidance moving.

Furthermore, in another example, the searching motion may be carried out at a time point when a separation distance between the first cleaner 100a and the second cleaner 100b decreases to a reference range.

The searching motion may be carried out until the second cleaner 100b is located behind the first cleaner 100a on the basis of the current moving direction of the first cleaner 100a. While the searching motion is carried out as described above, the positions of an additional trajectory corresponding to the moving of the first cleaner 100a may be stored in the memory of the second cleaner 100b. Accordingly, the total length of trajectory to be followed by the second cleaner 100b may increase.

Figure 11G:
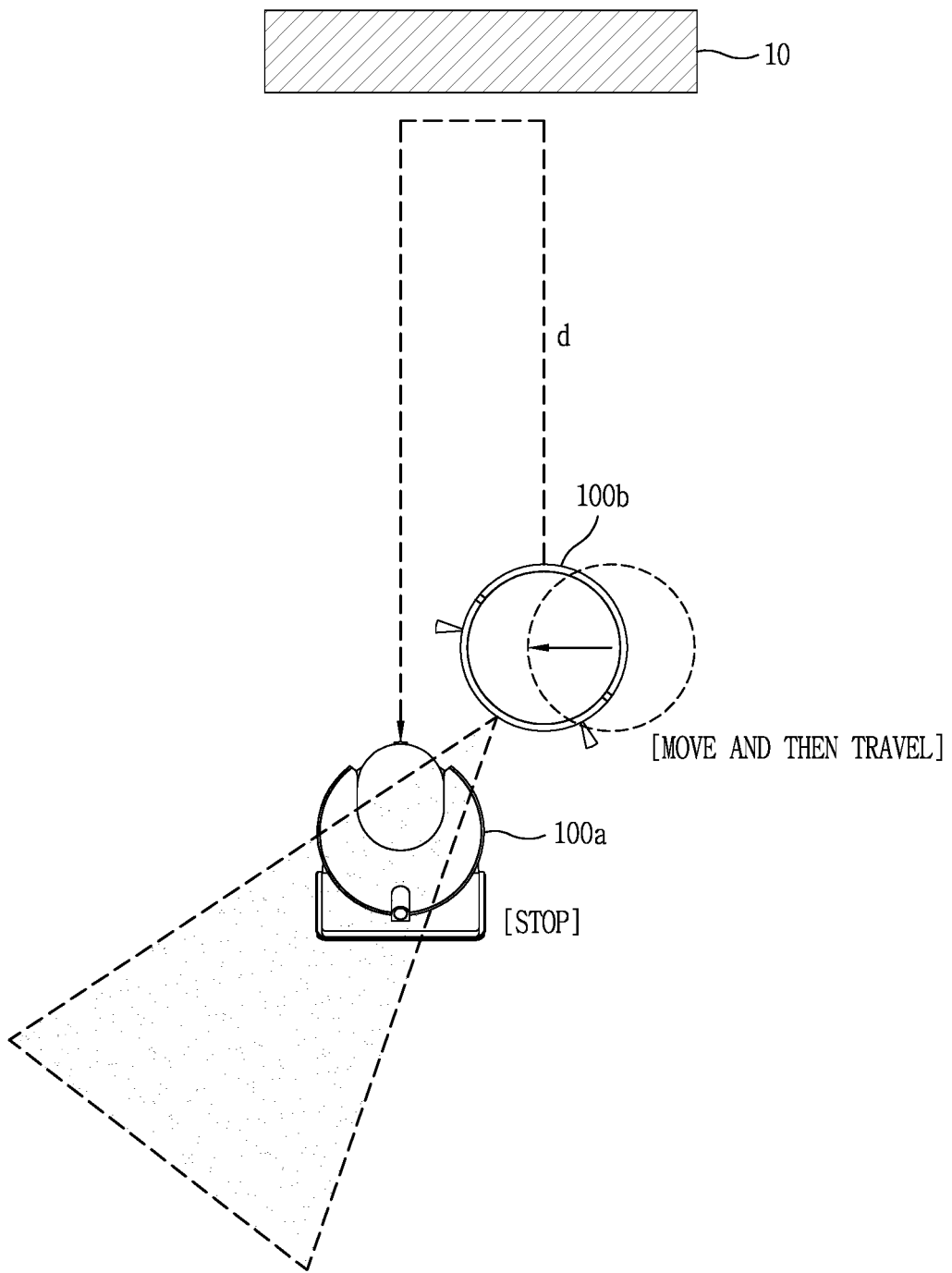
FIG. 11G is another exemplary conceptual view illustrating a moving operation based on a length of trajectory to be followed by a plurality of mobile robots according an embodiment of the present disclosure in association with FIG. 10.
Figure 11H:
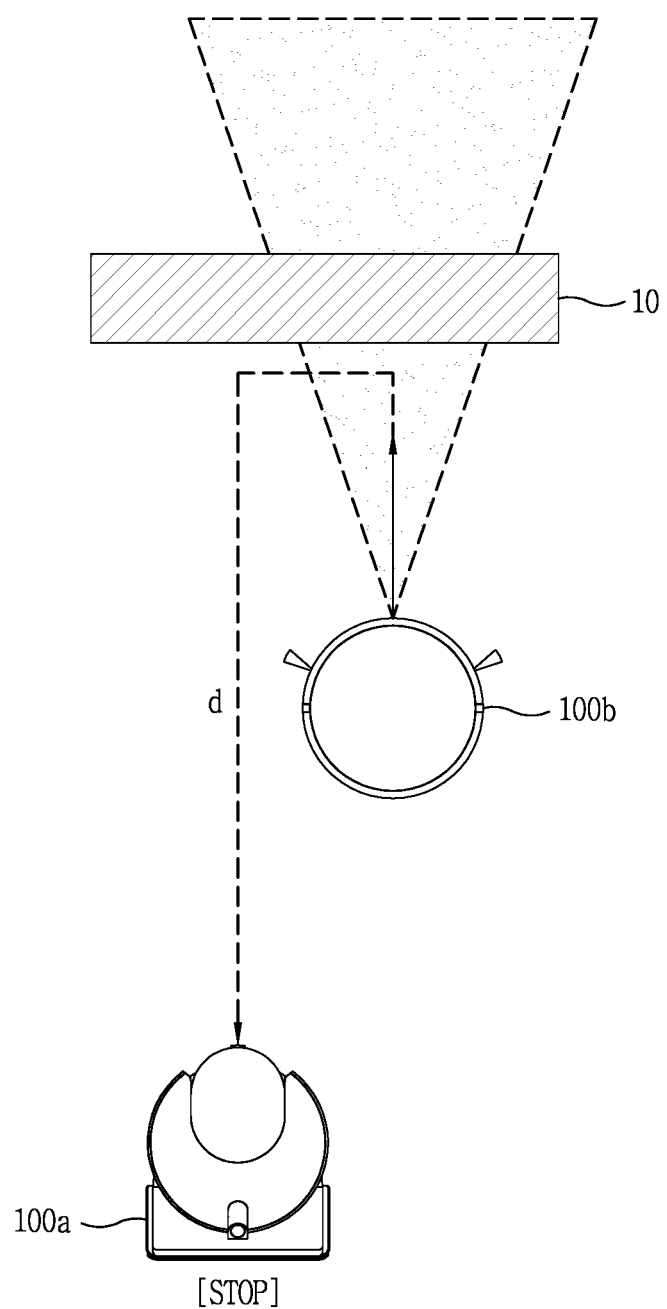
FIG. 11H is another exemplary conceptual view illustrating a moving operation based on a length of trajectory to be followed by a plurality of mobile robots according an embodiment of the present disclosure in association with FIG. 10.

Subsequent to, referring to FIG. 11G, when a distance of trajectory to be followed by the second cleaner 100b exceeds a predetermined follow-up distance range to reach a critical stop distance, the first cleaner 100a may stop moving. Accordingly, the second cleaner 100b may be controlled so as to stop the searching motion and sequentially follow the stored positions of the trajectory stored in the memory. Then, as illustrated in FIG. 11H, the second cleaner 100b may move while following the moving trajectory of the first cleaner 100a in FIGS. 11B through 11D.

Figure 11I:
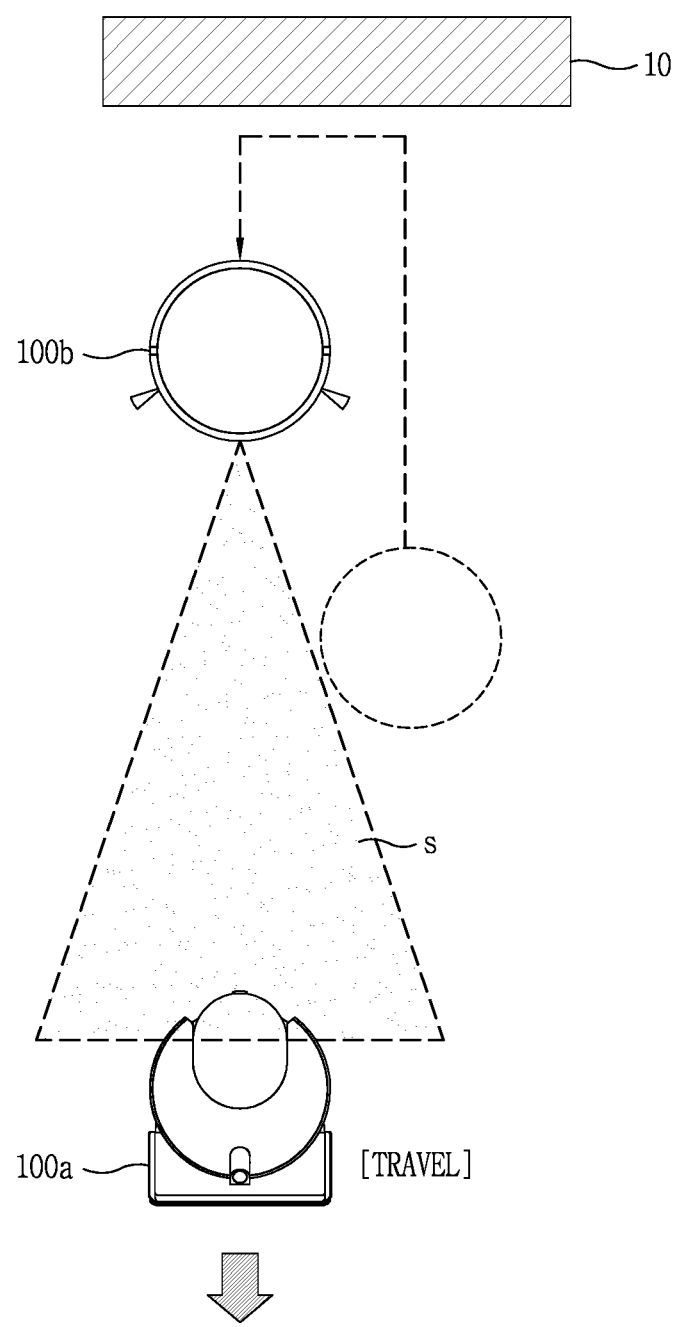
FIG. 11I is another exemplary conceptual view illustrating a moving operation based on a length of trajectory to be followed by a plurality of mobile robots according an embodiment of the present disclosure in association with FIG. 10.

Then, as illustrated in FIG. 11I, when the length of trajectory to be followed by the second cleaner 100b becomes equal to or less than a predetermined follow-up distance range, the first cleaner 100a may start moving.

At this time, the moving resuming of the first cleaner 100a may be carried out at a time point when the first cleaner 100a is sensed in a virtual area (S) formed by a sensor provided at a front side of the second cleaner 100b, as illustrated in FIG. 11I. Then, the second cleaner 100b may move while following the positions of a trajectory close to the first cleaner 100a existing in the virtual area (S) one by one at the current position.

Referring to FIG. 10 again, when it is not a case where the second cleaner 100b performs avoidance moving and searching motion, the second cleaner 100b may output a control command for reducing or stopping the movement speed of the first cleaner 100a not to further increase the length of trajectory to be followed by the second cleaner 100b.

In one example, the first cleaner 100a may output a control command for reducing or stopping the movement speed by itself.

Specifically, when the length of trajectory to be followed by the second cleaner 100b is larger than a predetermined follow-up distance range but smaller than a critical stop distance (e.g., 90 cm to 100 cm), a control command for reducing the movement speed of the first cleaner 100a may be output. Furthermore, moving may be controlled to allow the second cleaner 100b to initially follow the positions of a trajectory closest to the current position of the second cleaner 100b among a plurality of trajectories within the predetermined follow-up distance range. At this time, the positions of a trajectory out of the predetermined follow-up distance range may be ignored or removed without following.

In addition, when the length of trajectory to be followed by the second cleaner 100b further increases to reach the critical stop distance, the first cleaner 100a may stop moving.

Furthermore, in step S1110 in FIG. 10, when a distance of trajectory to be followed by the second cleaner 100b decreases below a predetermined follow-up distance range, the second cleaner 100b may be controlled to stop the moving of the second cleaner 100b, and follow the trajectory of the first cleaner 100a after a predetermined period of time (S1120). The operation of the second cleaner 100b may be controlled by the controller of the first cleaner 100a, as described above.

Here, the predetermined period of time may be a time period typically required until the length of trajectory to be followed by the second cleaner 100b increases to satisfy the predetermined follow-up distance range.

The second cleaner 100b may perform searching motion to track the trajectory of the first cleaner 100a for a predetermined period of time subsequent to moving stop, and store the corresponding positions of the trajectory in the memory.

Furthermore, after the lapse of the predetermined period of time or at a time point when it is sensed that the length of trajectory to be followed by the second cleaner 100b satisfies a predetermined follow-up distance range, the second cleaner 100b may move while following the stored positions of the trajectory.

On the other hand, in the above-described embodiments, whether or not the length of trajectory to be followed by the second cleaner 100b deviates from a predetermined follow-up distance range may be determined based on the positions of a trajectory of the first cleaner 100a sensed and stored by the second cleaner 100b.

In addition, in the above embodiments, the moving of the first cleaner 100a and/or the second cleaner 100b corresponding to whether or not the length of trajectory to be followed by the second cleaner 100b deviates from a predetermined follow-up distance range may also be controlled through the controller of the first cleaner 100a.

Figure 12A:
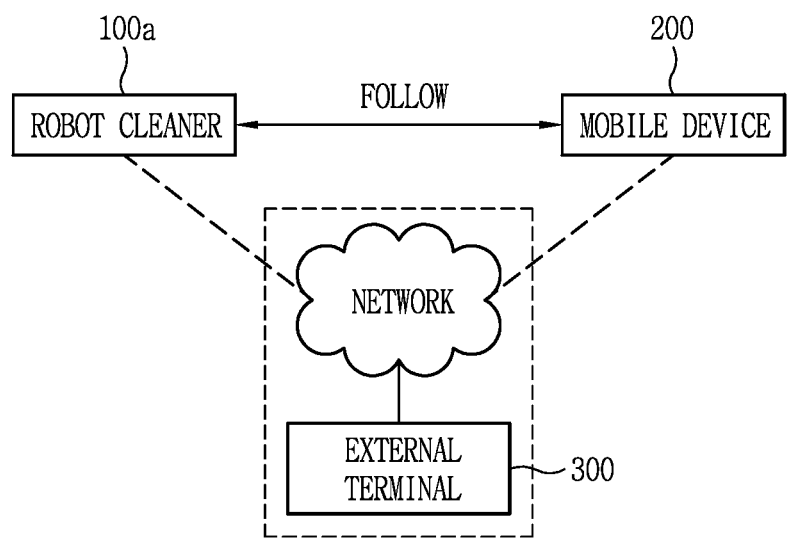
FIG. 12A is a conceptual view illustrating follow-up registration and follow-up control between a mobile robot and other mobile devices according to an embodiment of the present disclosure.
Figure 12B:
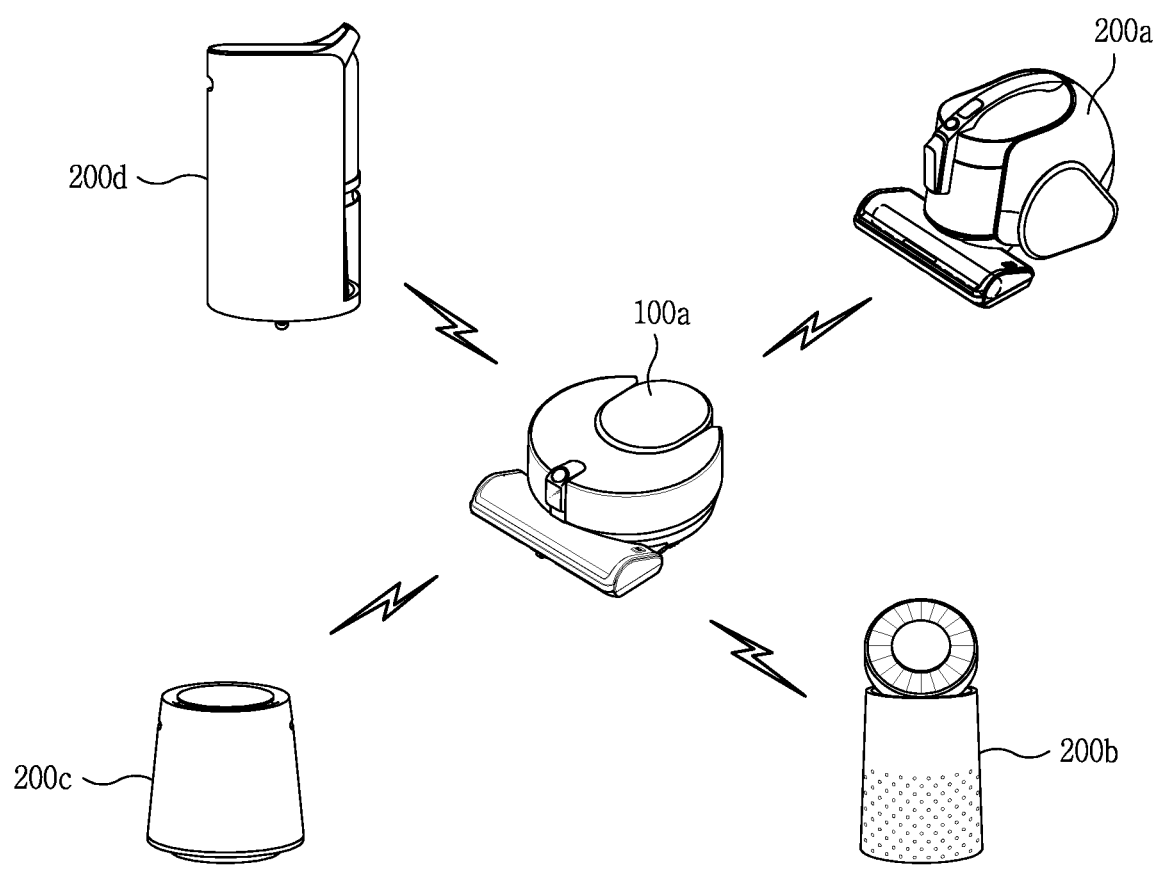
FIG. 12B is another conceptual view illustrating follow-up registration and follow-up control between a mobile robot and other mobile devices according to an embodiment of the present disclosure.
Figure 12C:
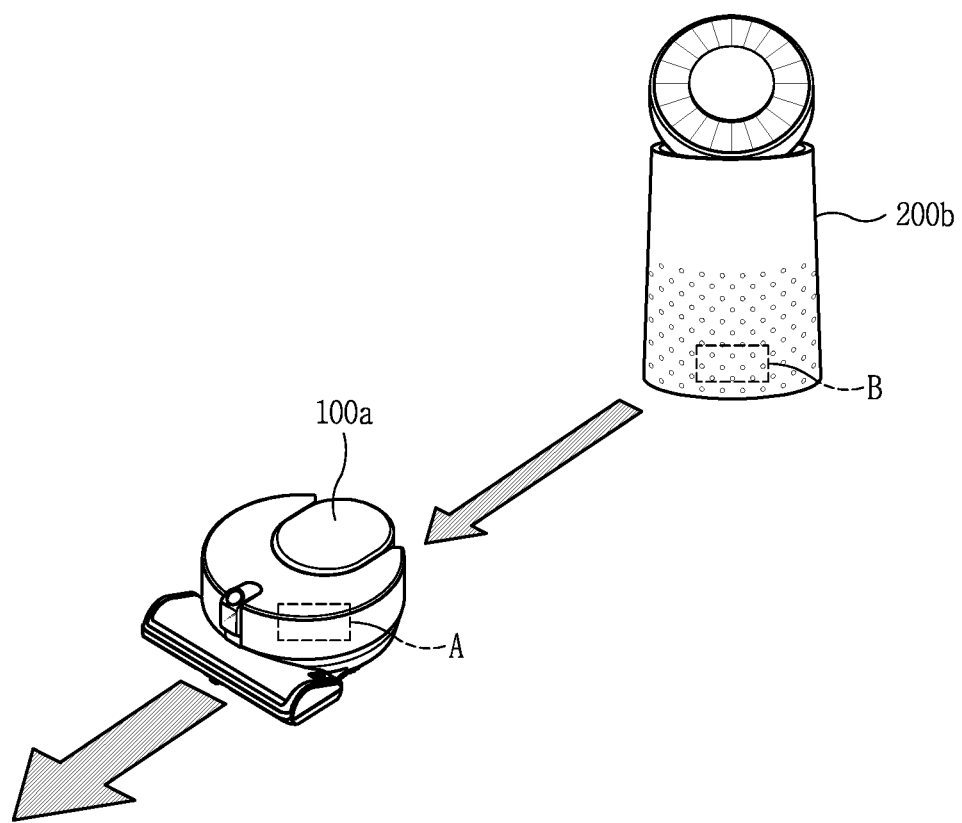
FIG. 12C is another conceptual view illustrating follow-up registration and follow-up control between a mobile robot and other mobile devices according to an embodiment of the present disclosure.

Hereinafter, FIGS. 12A, 12B, and 12C are modified examples of follow-up control between the first cleaner and the second cleaner in accordance with the foregoing embodiments of the present disclosure, and here, follow-up control between the first cleaner and a mobile device will be described in detail.

Here, the follow-up control disclosed herein means only that the mobile device follows a movement path of the first cleaner.

Referring to FIG. 12A, the first cleaner 100a may control the follow-up of a mobile device 200 by communicating with the mobile device 200 instead of the second cleaner.

Here, the mobile device 200 may not have a cleaning function, and may be any electronic device if it is provided with a driving function. For example, the mobile device 200 may include various types of home appliances or other electronic devices, such as a dehumidifier, a humidifier, an air purifier, an air conditioner, a smart TV, an artificial intelligent speaker, a digital photographing device, and the like, with no limit.

In addition, the mobile device 200 may be any device if it is equipped with a moving function, and may not have a navigation function for detecting an obstacle by itself or moving up to a predetermined destination.

The first cleaner 100a may be a robot cleaner having both the navigation function and the obstacle detection function and can control the follow-up of the mobile device 200. The first cleaner 100a may be a dry cleaner or a wet cleaner.

The first cleaner 100a and the mobile device 200 can communicate with each other through a network (not shown), but may directly communicate with each other.

Here, the communication using the network may be communication using, for example, WLAN, WPAN, Wi-Fi, Wi-Fi Direct, Digital Living Network Alliance (DLNA), Wireless Broadband (WiBro), World Interoperability for Microwave Access (WiMAX), etc. The mutual direct communication may be performed using, for example, UWB, Zigbee, Z-wave, Blue-Tooth, RFID, and Infrared Data Association (IrDA), or the like.

If the first cleaner 100a and the mobile device 200 are close to each other, the mobile device 200 may be set to follow the first cleaner 100a through a manipulation in the first cleaner 100a.

When the first cleaner 100a and the mobile device 200 are far away from each other, for example, the mobile device 200 may be set to follow the first cleaner 100a through a manipulation in an external terminal 300 (see FIG. 5A).

Specifically, follow-up relationship between the first cleaner 100a and the mobile device 200 may be established through network communication with the external terminal 300. Here, the external terminal 300 may be an electronic device capable of performing wired or wireless communication, and may be a tablet, a smart phone, a notebook computer, or the like. At least one application related to follow-up control by the first cleaner 100a (hereinafter, "follow-up related application") may be installed in the external terminal 300.

The user may execute the follow-up related application installed in the external terminal 300 to select and register the mobile device 200 subjected to the follow-up control by the first cleaner 100a. When the mobile device 200 subjected to the follow-up control is registered, the external terminal may recognize product information of the mobile device, and such product information may be provided to the first cleaner 100a via the network.

The external terminal 300 may recognize the position of the first cleaner 100a and the position of the registered mobile device 200 through communication with the first cleaner 100a and the registered mobile device 200. Afterwards, the first cleaner 100a may move toward the position of the registered mobile device 200 or the registered mobile device 200 may move toward the position of the first cleaner 100a according to a control signal transmitted from the external terminal 300.

When it is detected that the relative positions of the first cleaner 100a and the registered mobile device 200 are within a predetermined following distance, the follow-up control for the mobile device 200 by the first cleaner 100a may be started. After then, the follow-up control may be performed by direct communication between the first cleaner 100a and the mobile device 200 without the intervention of the external terminal 300.

The setting of the follow-up control may be released by the operation of the external terminal 300 or automatically terminated as the first cleaner 100a and the mobile device 200 move away from the predetermined following distance.

The user can change, add or remove the mobile device 200 to be controlled by the first cleaner 100a by manipulating the first cleaner 100a or the external terminal 300. For example, referring to FIG. 12B, the first cleaner 100a may perform the follow-up control for at least one mobile device 200 of another cleaner 200a or 100b, an air purifier 200b, a humidifier 200c, and a dehumidifier 200d.

In general, since the mobile device 200 is different from the first cleaner 100a in its function, product size, and moving ability, it may be difficult for the mobile device 200 to follow the movement path of the mobile terminal 100a as it is. For example, there may be an exceptional situation in which it is difficult for the mobile device 200 to follow the movement path of the first cleaner 100a according to a moving mode, a geographic feature of a space, a size of an obstacle, and the like.

In consideration of such an exceptional situation, the mobile device 200 may move or wait by omitting a part of the movement path even if it recognizes the movement path of the first cleaner 100a. To this end, the first cleaner 100a may detect whether or not the exceptional situation occurs, and control the mobile device 200 to store data corresponding to the movement path of the first cleaner 100a in a memory or the like. Then, depending on situations, the first cleaner 100a may control the mobile device 200 to move with deleting part of the stored data or to wait in a stopped state.

FIG. 12C illustrates an example of a follow-up control between the first cleaner 100a and the mobile device 200, for example, the air cleaner 200b having a moving function. The first cleaner 100a and the air purifier 200b may include communication modules A and B for determining relative positions thereof, respectively. The communication modules A and B may be one of modules for emitting and receiving an IR signal, an ultrasonic signal, a carrier frequency, or an impulse signal. The recognition of the relative positions through the communication modules A and B has been described above in detail, so a description thereof will be omitted.

The air purifier 200b may receive moving information corresponding to a moving command (e.g., changes in moving including a moving direction and a moving speed, moving stop, etc.) from the first cleaner 100a, move according to the received moving information, and perform air purification. Accordingly, the air purification may be performed in real time with respect to a cleaning space in which the first cleaner 100a operates. In addition, since the first cleaner 100a has already recognized the production information related to the mobile device 200, the first cleaner 100a can control the air purifier 200b to record the moving information of the first cleaner 100a, and move with deleting part of the moving information or wait in a stopped state.

As described above, according to a robot cleaner and a control method thereof according to an embodiment of the present disclosure, the following cleaner may perform cleaning without any interruption while following the leading cleaner without through a server. Furthermore, follow-up moving of the follower cleaner may be controlled on the basis of a length of a trajectory to be actually followed by the follower cleaner during follow-up of a plurality of robot cleaners thereby performing efficient follow-up control without collision or delay even in an exceptional situation where the moving directions of the head cleaner and the follower cleaner are different or they should avoid each other, and a control method thereof. Furthermore, the moving of the head cleaner and the follower cleaner may be controlled in consideration of both a length of trajectory to be actually followed by the follower cleaner and a separation distance between a plurality of robot cleaners during follow-up of the plurality of robot cleaners. In addition, when the length of the trajectory to be followed by the follower cleaner decreases, the movement speed of the follower cleaner may be reduced or the trajectory of the head cleaner may be followed in place, and when the length of the trajectory to be followed by the follower cleaner increases, the movement speed of the head cleaner decreases or stops, thereby performing visually stable follow-up control while the follower cleaner follows the head cleaner without missing it.

The present disclosure described above may be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 1800. The above detailed description should not be limitedly construed in all aspects and should be considered as illustrative. The scope of the present invention should be determined by rational interpretation of the appended claims, and all changes within the scope of equivalents of the present invention are included in the scope of the present disclosure.

What is the claimed is:

1. A mobile robot, comprising:
    a main body;
    a moving unit configured to move the main body;
    a communication unit configured to communicate with a second mobile robot that emits a signal; and
    a controller configured to:
        recognize a position of the second mobile robot using the signal;
        control the moving unit to follow a trajectory corresponding to a movement of the second mobile robot based on the recognized position;
        determine whether a length of the trajectory to be followed by the main body deviates from a predetermined range; and
        in response to a length of trajectory to be followed by the main body deviating from a predetermined range, output a control command to cause a moving speed of the main body or the second mobile robot to change,
    wherein the controller is further configured to continuously control the second mobile robot to follow the trajectory corresponding to the movement of the main body until the length of the trajectory satisfies the predetermined range, wherein the predetermined range is a distance range between a first distance and a second distance, wherein the second distance is longer than the first distance.

2. The mobile robot of claim 1, wherein the controller is further configured to determine the length of trajectory to be followed based on positions of a plurality of points forming the trajectory corresponding to the movement of the second mobile robot and a current position of the main body.

3. The mobile robot of claim 1, wherein the controller is further configured to:
    sense positions of a plurality of points forming the trajectory corresponding to the movement of the second mobile robot;
    store information corresponding the positions of the plurality of points in a predetermined distance unit; and
    sense that the length of trajectory to be followed deviates from the predetermined range based on the stored information.

4. The mobile robot of claim 3, wherein the controller is further configured to:
    control the main body to sequentially follow the plurality of points corresponding to the stored information while the length of trajectory to be followed is maintained within the predetermined range; and
    delete the stored information after the main body moves to a relevant point.

5. The mobile robot of claim 1, wherein the controller is further configured to, in response to the length of trajectory to be followed by the main body increasing beyond the predetermined range, output a control command to cause the second mobile robot to reduce a movement speed.

6. The mobile robot of claim 1, wherein the controller is further configured to, in response to the length of trajectory to be followed by the main body exceeding the predetermined range and reaching a critical stop distance, output a control command to cause the second mobile robot to stop from moving.

7. The mobile robot of claim 1, wherein the controller is further configured to, in response to the length of trajectory to be followed by the main body decreasing below the predetermined range, output a control command to cause the main body to stop from moving.

8. The mobile robot of claim 1, wherein the controller is further configured to:
    monitor a separation distance between the main body and the second mobile robot using the recognized position; and
    in response to the separation distance between the main body and the second mobile robot decreasing below the predetermined range while the length of trajectory to be followed by the main body is maintained within the predetermined range, output a control command to cause the second mobile robot to reduce a movement speed.

9. The mobile robot of claim 1, wherein the controller is further configured to, in response to the length of trajectory to be followed by the main body increasing beyond the predetermined range, control a movement of the main body to follow a point close to a current position of the main body among a plurality of points forming the trajectory within the predetermined range.

10. The mobile robot of claim 1, wherein the controller is further configured to, in response to the length of trajectory to be followed by the main body decreasing below the predetermined range, control a movement of the main body to follow a plurality of points forming the trajectory corresponding to the movement of the second mobile robot at a current position of the main body.

11. The mobile robot of claim 10, wherein the controller is further configured to, in response to the length of trajectory to be followed by the main body increasing to the predetermined range while performing the motion, control a movement of the main body to end a motion and follow a point close to the current position of the main body among the plurality of points.

12. A plurality of mobile robots, including:
    a first mobile robot; and
    a second mobile robot, wherein:
    the first mobile robot is configured to:
    communicate with the second mobile robot that sends a signal to recognize a position of the second mobile robot;
    control the second mobile robot to follow a trajectory corresponding to a movement of the first mobile robot based on the recognized position; and
    in response to a length of the trajectory to be followed by the second mobile robot deviating from a predetermined range, output a control command to cause a movement speed of the first mobile robot or the second mobile robot to change,
    wherein the first mobile robot is further configured to continuously control the second mobile robot to follow the trajectory corresponding to the movement of the first mobile robot until the length of the trajectory satisfies the predetermined range, wherein the predetermined range is a distance range between a first distance and a second distance, wherein the second distance is longer than the first distance, and the second mobile robot is configured to:

communicate with the first mobile robot that sends a signal to sense a plurality of points forming the trajectory corresponding to the movement of the first mobile robot; and sequentially follow the sensed plurality of points.

13. The plurality of mobile robots of claim 12, wherein the first mobile robot is further configured to determine a length of the trajectory to be followed by the second mobile robot based on positions of the plurality of points forming the trajectory corresponding to the movement of the first mobile robot and a relative position of the second mobile robot.

14. The plurality of mobile robots of claim 12, wherein:

the second mobile robot is further configured to store information corresponding to positions of the sensed plurality of points in a predetermined distance unit, the first mobile robot is further configured to sense that the length of trajectory to follow deviates from a predetermined range based on the information stored in the second mobile robot, and the second mobile robot is further configured to sequentially move based on the stored information, and delete information corresponding to the moved points while the length of trajectory to follow satisfies the predetermined range.

15. A method of controlling a mobile robot, the method comprising:

allowing a main body of a first mobile robot to communicate with a second mobile robot that sends a signal to recognize a relative position of the second mobile robot;

controlling a movement of the main body of the first mobile robot to follow a trajectory corresponding to a movement of the second mobile robot based on the recognized relative position;

allowing the first mobile robot to sense that a length of the trajectory of the second mobile robot to follow deviates from a predetermined range;

continuously controlling the second mobile robot to follow the trajectory corresponding to the movement of the first mobile robot until the length of the trajectory satisfies the predetermined range, wherein the predetermined range is a distance range between a first distance and a second distance, wherein the second distance is longer than the first distance; and outputting a control command to change a movement speed of the main body or the second mobile robot in response to the sensed deviation.

16. The method of claim 15, wherein outputting a control command comprises:

in response to the length of trajectory to be followed by the main body increasing beyond the predetermined range, outputting a control command to cause the second mobile robot to reduce a movement speed.

17. The method of claim 15, wherein outputting a control command comprises:

in response to the length of trajectory to be followed by the main body exceeding the predetermined range and reaching a critical stop distance, outputting a control command to cause the second mobile robot to stop.

18. The method of claim 15, wherein outputting a control command comprises:

in response to the length of trajectory to be followed by the main body decreasing below the predetermined range, outputting a control command to cause the main body to stop.

* * * * *